(12) United States Patent
Crowther et al.

(10) Patent No.: US 8,993,702 B2
(45) Date of Patent: Mar. 31, 2015

(54) ENHANCED CATALYST PERFORMANCE FOR PRODUCTION OF VINYL TERMINATED PROPYLENE AND ETHYLENE/PROPYLENE MACROMERS

(71) Applicant: ExxonMobil Chemical Patents Inc., Baytown, TX (US)

(72) Inventors: Donna J. Crowther, Seabrook, TX (US); Renuka N. Ganesh, Houston, TX (US); Andrew G. Narvaez, Jr., League City, TX (US); Patrick Brant, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 49 days.

(21) Appl. No.: 13/655,674

(22) Filed: Oct. 19, 2012

(65) Prior Publication Data
US 2013/0197180 A1 Aug. 1, 2013

Related U.S. Application Data

(62) Division of application No. 13/072,279, filed on Mar. 25, 2011, now Pat. No. 8,318,998.

(51) Int. Cl.
| | |
|---|---|
| *C08F 210/02* | (2006.01) |
| *C08F 210/06* | (2006.01) |
| *C08F 4/642* | (2006.01) |
| *C08F 4/6592* | (2006.01) |
| *C08F 10/06* | (2006.01) |
| *B01J 31/22* | (2006.01) |
| *C08F 10/00* | (2006.01) |
| C08F 110/06 | (2006.01) |

(52) U.S. Cl.
CPC ............ *C08F 10/06* (2013.01); *B01J 31/2295* (2013.01); *B01J 2231/12* (2013.01); *B01J 2531/48* (2013.01); *B01J 2531/49* (2013.01); *C08F 110/06* (2013.01); *C08F 210/06* (2013.01); *C08F 4/65925* (2013.01); *C08F 4/65927* (2013.01); *C08F 10/00* (2013.01); Y10S 526/943 (2013.01)
USPC ........... 526/348; 526/133; 526/134; 526/160; 526/943

(58) Field of Classification Search
CPC ........ C08F 4/6592; C08F 10/02; C08F 10/06; C08F 210/02; C08F 210/06; C08F 4/65912
USPC .......................... 526/133, 134, 160, 348, 943
See application file for complete search history.

(56) References Cited

U.S. PATENT DOCUMENTS

| | | |
|---|---|---|
| 4,110,377 A | 8/1978 | Clerici et al. |
| 4,814,540 A | 3/1989 | Watanabe et al. |
| 4,988,764 A | 1/1991 | Nishio et al. |
| 5,444,125 A | 8/1995 | Tomita et al. |

(Continued)

FOREIGN PATENT DOCUMENTS

| | | |
|---|---|---|
| EP | 0 958 309 | 11/1999 |
| JP | 2005-336092 | 12/2005 |

(Continued)

OTHER PUBLICATIONS

Amin et al., "*Versatile Pathways for In Situ Polyolefin Functionalization with Heteroatoms: Catalytic Chain Transfer*", Angewandte Chemie International Edition, 2008, vol. 47, pp. 2006-2025.
Ayinla et al., "Chiral Tantalum and Zironium Biphenyl Amidate Complexes: New Catalysts for the Assymetric Synthesis of Amines", Abstracts of Papers, 238th ACS National Meeting, Washington DC, United States, Aug. 16-20, 2009, INOR-252.
Babu et al., "*Microstructure of Poly(1-hexene) Produced by ansa-Zirconocenium Catalysis*", Macromolecules, 1994, vol. 27, pp. 3383-3388.

(Continued)

*Primary Examiner* — Caixia Lu

(57) ABSTRACT

This invention relates to a transition metal catalyst compound represented by the structure:

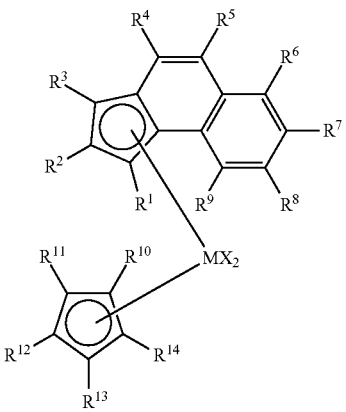

wherein
M is hafnium or zirconium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;
each $R^1$ and $R^3$ are, independently, a $C_1$ to $C_8$ alkyl group; and each $R^2$, $R^4$, $R^5$, $R^6$, $R^7$, $R^8$, $R^9$, $R^{10}$, $R^{11}$, $R^{12}$, $R^{13}$, and $R^{14}$ are, independently, hydrogen, or a substituted or unsubstituted hydrocarbyl group having from 1 to 8 carbon atoms, provided however that at least three of the $R^{10}$-$R^{14}$ groups are not hydrogen, compositions thereof and methods of use thereof to prepare polymers.

25 Claims, 1 Drawing Sheet

(56) References Cited

U.S. PATENT DOCUMENTS

| | | | |
|---|---|---|---|
| 5,498,809 | A | 3/1996 | Emert et al. |
| 5,705,577 | A | 1/1998 | Rossi et al. |
| 5,811,379 | A | 9/1998 | Rossi et al. |
| 5,859,159 | A | 1/1999 | Rossi et al. |
| 5,936,041 | A | 8/1999 | Diana et al. |
| 6,117,962 | A | 9/2000 | Weng et al. |
| 6,225,432 | B1 | 5/2001 | Weng et al. |
| 6,255,426 | B1 | 7/2001 | Lue et al. |
| 6,897,261 | B1 | 5/2005 | Machida et al. |
| 7,294,681 | B2 | 11/2007 | Jiang et al. |
| 7,524,910 | B2 | 4/2009 | Jiang et al. |
| 7,790,810 | B2 | 9/2010 | Coates et al. |
| 2005/0159299 | A1 | 7/2005 | Rodriguez et al. |
| 2009/0198089 | A1 | 8/2009 | Burton et al. |
| 2009/0318644 | A1 | 12/2009 | Brant et al. |
| 2009/0318646 | A1 | 12/2009 | Brant et al. |
| 2009/0318664 | A1 | 12/2009 | Yang et al. |
| 2010/0170829 | A1 | 7/2010 | Ng et al. |

FOREIGN PATENT DOCUMENTS

| | | |
|---|---|---|
| JP | 2009-299046 | 12/2009 |
| JP | 2010-202628 | 9/2010 |
| WO | WO 95/27717 | 10/1995 |
| WO | WO 2008/080081 | 7/2008 |
| WO | WO 2010/037059 | 4/2010 |

OTHER PUBLICATIONS

Baldwin et al., "Cationic Alkylaluminum-Complexed Zirconocene Hydrides as Participants in Olefin Polymerization Catalysis", JACS, 2010, vol. 132, pp. 13969-13971.

Bhriain et al., "Polymeryl-Exchange Between Ansa-Zirconocene Catalysts for Norbornene-Ethene Copolymerization and Aluminum or Zinc Alkyls", Macromolecules, 2005, vol. 38, pp. 2056-2063.

Bielawski et al., "Synthesis of ABA Triblock Copolymers Via a Tandem Ring-Opening Metathesis Polymerization: Atom Transfer Radical Polymerization Approach", Macromolecules, 2000, vol. 33, pp. 678-680.

Brant et al., "Effect of Tacticity on the Dilute Solution Coil Dimensions of Poly(a-olefin)s", Macromolecules, 2005, vol. 38, pp. 7178-7183.

Cherian et al., "Synthesis of Allyl-Terminated Syndiotactic Polypropylene: Macromonomers for the Synthesis of Branched Polyolefins", Macromolecules, 2005, vol. 38, pp. 6259-6268.

Chung, "Synthesis of Functional Polyolefin Copolymers with Graft and Block Structures", Progress in Polymer Science, 2002, vol. 27, pp. 39-85.

Clerici et al., "Catalytic C-Alkylation of Secondary Amines With Alkenes", Synthesis, 1980, vol. 4, pp. 305-306.

Corey et al., "Reactions of Hydrosilanes and Olefins in the Presence of $Cp_2MCl_2/nBuLi$", Organometallics, 1992, vol. 11, pp. 672-683.

Crowther et al., "Group 4 Metal Dicarbollide Chemistry. Synthesis, Structure, and Reactivity of Electrophilie Alkyl Complexes $(Cp*)(C2B9H_{11})M(R)$ $(M=Hf, Zr)$", JACS, 1991, vol. 113, pp. 1455-1457.

Eisenberger et al., "Tantalum-amidate Complexes for the Hydroaminoalkylation of Secondary Amines: Enhanced Substrate Scope and Enantioselective Chiral Amine Synthesis", Angewandte Chemie International Edition, 2009, vol. 48, pp. 8361-8365.

Eshuis et al., "Catalytic Olefin Oligomerization and Polymerization with Cationic Group IV Metal Complexes $[Cp*_2Mme(THT)]^+[BPh_4]^-$, $M=Ti$, $Zr$ and $Hf$", Journal of Molecular Catalysis, 1990, vol. 62, pp. 277-287.

Frauenrath et al., "Polymerization of 1-Hexene Catalyzed by Bis(Cyclopentadienyl)Zirconium Dichloride/Methylaluminoxane; Effect of Temperature on the Molecular Weight and the Microstructure of Poly(1-Hexene)", Macromol. Rapid Commun., 1998, vol. 19, pp. 391-395.

Furuyama et al., "New High-Performance Catalysts Developed at Mitsui Chemicals for Polyolefins and Organic Synthesis", Catalysis Surveys from Asia, 2004, vol. 8, No. 1, pp. 61-71.

Galeotti et al., "Self-Functionalizing Polymer Film Surfaces Assisted by Specific Polystyrene End-Tagging",Chem. Mater., 2010, vol. 22, pp. 2764-2769.

Harney et al., "End-Group-Confined Chain Walking Within A Group 4 Living Polyolefin and Well-Defined Cationic Zirconium Alkyl Complexes for Modeling This Behavior", JACS, 2004, vol. 126, pp. 4536-4537.

Herzon et al., "Direct, Catalytic Hydroaminoalkylation of Unactivated Olefins with N-Alkyl Arylamines", JACS, 2007, vol. 129, pp. 6690-6691.

Herzon et al., "Hydroaminoalkylation of Unactivated Olefins with Dialkylamines", JACS, 2007, vol. 130, pp. 14940-14941.

Janiak et al., "Analyses of Propene and 1-Hexene Oligomers from Zirconium/MAO Catalysts—Mechanistic Implications by NMR, SEC, and MALDI-TOF MS", Macromol. Chem. Phys., 2002, vol. 203, pp. 129-138.

Janiak et al., "Metallocene Catalysts for Olefin Oligomerization", Macromol. Symp., 2006, vol. 236, pp. 14-22.

Janiak et al., "Metallocene and Related Catalysts for Olefin, Alkyne and Silane Dimerization and Oligomerization", Coordination Chemistry Reviews, 2006, vol. 250, pp. 66-94.

Jiang et al., "Highly Z-Selective Metathesis Homocoupling of Terminal Olefins", JACS, 2009, vol. 131, pp. 16630-16631.

Jones et al., "Synthesis and Reactive Blending of Amine and Anhydride End-Functional Polyolefins", Polymer, 2004, vol. 45, pp. 4189-4201.

Kaneyoshi et al., "Synthesis of Block and Graft Copolymers with Linear Polyethylene Segments by Combination of Degenerative Transfer Coordination Polymerization and Atom Transfer Radical Polymerization", Macromolecules, 2005, vol. 38, pp. 5425-5435.

Kesti et al., "Group 4 Metallocene Olefin Hydrosilyation Catalysts", Organometallics, 1992, vol. 11, pp. 1095-1103.

Kissin et al., "Post-Oligomerization of a-Olefin Oligomers: A Route to Single-Component and Multipcomponent Synthetic Lubricating Oils", Journal of Applied Polymer Science, 2009, vol. 111, pp. 273-280.

Kolodka et al., "Copolymerization of Propylene with Poly(Ethylene-Co-Propylene) Macromonomer and Branch Chain-Length Dependence of Rheological Properties", Macromolecules, 2002, vol. 35, pp. 10062-10070.

Kolodka et al., "Synthesis and Characterization of Long-Chain-Branched Polyolefins with Metallocene Catalysts: Copolymerization of Ethylene with Poly(Ethylene-Co-Propylene) Macromonomer", Macromol. Rapid Commun., 2003, vol. 24, pp. 311-315.

Koo et al., "Efficient New Routes to Functionalized Polyolefins", ChemTech. 1999, pp. 13-19.

Kostalik et al., "Solvent Processable Tetraalkylammonium-Functionalized Polyethylene for Use as an Alkaline Anion Exchange Membrane", Macromolecules, 2010, vol. 43, pp. 7147-7150.

Kubiak et al., "Titanium-Catalyzed Hydroaminoalkylation of Alkenes by C-H Bond Activation at SP3 Centers in the Alpha-Position to a Nitrogen Atom", Angewandte Chemie International Edition, 2009, vol. 48, No. 6, pp. 1153-1156.

Langston et al., "One-Pot Synthesis of Long Chain Branch PP (LCBPP) Using Ziegler-Natta Catalyst and Branching Reagents", Macromol. Symp., 2007, vol. 260, pp. 34-41.

Lehmus et al., "Chain End Isomerization as a Side Reaction in Metallocene-Catalyzed Ethylene and Propylene Polymerizations", Macromolecules, 2000, vol. 33, pp. 8534-8540.

Lopez et al., "Synthesis of Well-Defined Polymer Architectures by Successive Catalytic Olefin Polymerization and Living/Controlled Polymerization Reactions", Progress in Polymer Science, 2007, vol. 32, pp. 419-454.

Lu et al., "Reactivity of Common Functional Groups with Urethanes: Models for Reactive Compatibilization of Thermoplastic Polyurethane Blends", Journal of Polymer Science: Part A: Polymer Chemistry, 2002, vol. 40, pp. 2310-2328.

Markel et al., "Metallocene-Based-Branch—Block Thermoplastic Elastomers", Macromolecules, 2000, vol. 33, pp. 8541-8548.

Mathers et al., "Cross Metathesis Functionalization of Polyolefins", Chem. Commun., 2004, pp. 422-423.

Moscardi et al., "Propene Polymerization with the Isospecific, Highly Regioselective rac-$Me_2$ C(3-t-Bu-1-Ind)$_2$Zr$Cl_2$/MAO Catalyst. 2.

(56) References Cited

OTHER PUBLICATIONS

*Combined DFT/MM Analysis of Chain Propagation and Chain Release Reactions*", Organometallics, 2001, vol. 20, pp. 1918-1931.

Negishi et al., "*Reaction of Zirconocene Dichloride with Alkyllithiums or Alkyl Grignard Reagents as a Convenient Method for Generating a "Zirconocene" Equivalent and its Use in Zirconium-Promoted Cyclization of Alkenes, Alkynes, Dienes, Enynes, and Diynes[1]*", Tetrahedron Letters, 1986, vol. 27, No. 25, pp. 2829-2832.

Nilsson et al., *Structural Effects on Thermal Properties and Morphology in XLPE*, European Polymer Journal, 2010, vol. 46, pp. 1759-1769.

Ornealis et al., *Cross Olefin Metathesis for the Selective Functionalization, Ferrocenylation, and Solubilization in Water of Olefin-Terminated Dendrimers, Polymers, and Gold Nanoparticles and for a Divergent Dendrimer Construction*, JACS, 2008, vol. 130, pp. 1495-1506.

Ornealis et al., *Efficient Mono- and Bifunctionalization of Polyolefin Dendrimers by Olefin Metathesis*, Angewandte Chemie International Edition, 2005, vol. 44, pp. 7399-7404.

Parks et al., *Studies on the Mechanism of $B(C_6F_5)_3$-Catalyzed Hydrosilation of Carbonyl Functions*, J. Org. Chem., 2000, vol. 65, pp. 3090-3098.

Prochnow et al., *Tetrabenzyltitanium: An Improved Catalyst for the Activation of SP3 C-H Bonds Adjacent to Nitrogen Atoms*, ChemCatChem, 2009, vol. 1, No. 1, pp. 162-172.

Resconi et al., *Chain Transfer Reactions in Propylene Polymerization with Zirconocene Catalysts*, Topics in Catalysis, 1999, vol. 7, pp. 145-163.

Resconi et al., *Olefin Polymerization at Bis(pentamethylcyclopentadienyl)zirconium and -hafnium Centers: Chain-Transfer Mechanisms*, JACS, 1992, vol. 114, pp. 1025-1032.

Reznichenko et al., *Group 5 Metal Binapthalate Complexes for Catalytic Asymmetric Hydroaminoalkylation and Hydroamination/Cyclization*, Organometallics, 2011, vol. 30, pp. 921-924.

Roesky, *Catalytic Hydroaminoalkylation*, Angewandte Chemie International Edition, 2009, vol. 48, pp. 4892-4894.

Rose et al., *Poly(Ethylene-Co-Propylene Macromonomer)s: Synthesis and Evidence for Starlike Conformations in Dilute Solution*, Macromolecules, 2008, vol. 41, pp. 559-567.

Rossi et al., *End Groups in 1-Butene Polymerization Via Methylaluminoxane and Zirconocene Catalyst*, Macromolecules, 1995, vol. 28, pp. 1739-1749.

Rulhoff et al., *Synthesis and Characterization of Defined Branched Poly(propylene)s with Different Microstructures by Copolymerization of Propylene and Linear Ethylene Oligomers ($C_n=26-28$) with Metallocenes/MAO Catalysts*, Macromolecules, 2006, vol. 16, pp. 1450-1460.

Scherman et al., *Synthesis and Characterization of Stereoregular Ethylene-Vinyl Alcohol Copolymers Made by Ring-Opening Metathesis Polymerization*, Macromolecules, 2005, vol. 38, pp. 9009-9014.

Seayed et al., *Hydroaminomethylation of Olefins Using a Rhodium Carbene Catalyst*, Tetrahedron Letters, 2003, vol. 44, No. 8, pp. 1679-1683.

Segawa et al., *Catalytic Hydroaminoalkylation of Alkene*, Yuki Gosei Kagaku Kyokaishi, 2009, vol. 67, No. 8, pp. 834-844 (Abstract only).

Shiono et al., *Additive Effects of Trialkylaluminum on Propene Polymerization with (t-BuNSiMe$_2$Flu)TiMe$_2$-Based Catalysts*, Applied Catalysis A: General, 2000, vol. 200, pp. 145-152.

Shiono et al., *Copolymerization of Atactic Polypropene Macromonomer with Propene by an Isospecific Metallocene Catalyst*, Macromolecules, 1999, vol. 32, pp. 5723-5727.

Sill et al., *Bis-Dendritic Polyethylene Prepared by Ring-Opening Metathesis Polymerization in the Presence of Bis-Dendritic Chain Transfer Agents*, Journal of Polymer Science: Part A: Polymer Chemistry, 2005, vol. 43, pp. 5429-5439.

Small et al., *Polymerization of Propylene by a New Generation of Iron Catalysts: Mechanisms of Chain Initiation, Propagation, and Termination*, Macromolecules, 1999, vol. 32, pp. 2120-2130.

Stadler et al., *Long-Chain Branches in Syndiotactic Polypropene Induced by Vinyl Chloride*, Macromolecular Chemistry and Physics, 2010, vol. 211, pp. 1472-1481.

Sun et al., *Effect of Short Chain Branching on the Coil Dimensions of Polyolefins in Dilute Solution*, Macromolecules, 2001, vol. 34, pp. 6812-6820.

Sunderhaus et al., *Oxidation of Carbon-Silicon Bonds: The Dramatic Advantage of Strained Siletanes*, Organic Letters, 2003, vol. 5, No. 24, pp. 4571-4573.

Switek et al., *ABA Triblock Copolymers with A Ring-Opening Metathesis Polymerization/ Macromolecular Chain-Transfer Agent Approach*, Journal of Polymer Science: Part A: Polymer Chemistry, 2007, vol. 45, pp. 361-373.

Thomas et al., *Synthesis of Telechelic Polyisoprene via Ring-Opening Metathesis Polymerization in the Presence of Chain Transfer Agent*, Macromolecules, 2010, vol. 43, pp. 3705-3709.

Wei et al., *Aufbaureaktion Redux: Scalable Production of Precision Hydrocarbons from $AlR_3$ ($R=Et$ or iBu) by Dialkyl Zinc Mediated Ternary Living Coordinative Chain-Transfer Polymerization*, Angewandte Chemie Inernational Edition, 2010, vol. 49, pp. 1768-1772.

Weng et al., *Long Chain Branched Isotactic Polypropylene*, Macromolecules, 2002, vol. 35, pp. 3838-3843.

Weng et al., *Synthesis of Vinly-Terminated Isotactic Poly(Propylene)*, Macromol. Rapid Commun., 2000, vol. 21, pp. 1103-1107.

Yang et al., *Catatonic Metallocene Polymerization Catalysts, Synthesis and Properties of the First Base-Free Zirconocene Hydride*, Angewandte Chemie International Edition Engl., 1992, vol. 31, pp. 1375-1377.

Yin et al., *Scope and Mechanism of Allylic C-H Amination of Terminal Alkenes by the Palladium/PhL(OPiv)$_2$ Catalyst System: Insights into the Effect of Naphthoquinone*, JACS, 2010, vol. 132, pp. 11978-11987.

Zhang et al., *Functionalization of Polyolefins Through Catalytic Hydrosilylation and Imidation Reactions*, ANTEC, 2005, pp. 2686-2690.

Productivity vs. propylene concentration

Molecular weight vs. propylene concentration

ENHANCED CATALYST PERFORMANCE FOR PRODUCTION OF VINYL TERMINATED PROPYLENE AND ETHYLENE/PROPYLENE MACROMERS

PRIORITY

This application is a divisional of U.S. Ser. No. 13/072,279, filed Mar. 25, 2011.

STATEMENT OF RELATED APPLICATIONS

This application is related to U.S. Ser. No. 12/143,663, filed on Jun. 20, 2008 (Published as WO 2009/155471); U.S. Ser. No. 12/487,739, filed on Jun. 19, 2009 (Published as WO 2009/155472); U.S. Ser. No. 12/488,066, filed on Jun. 19, 2009 (Published as WO 2009/155510); 12/488,093 filed on Jun. 19, 2009 (Published as WO 2009/155517); and U.S. Ser. No. 12/642,453, filed Dec. 18, 2009; which is a continuation-in-part application of U.S. Ser. No. 12/533,465 filed on Jul. 31, 2009, which claims priority to and the benefit of U.S. Ser. No. 61/136,172, filed on Aug. 15, 2008; which are all incorporated by reference herein.

This invention also relates to the following concurrently filed applications:

a) U.S. Ser. No. 13/072,280, filed Mar. 25, 2011, entitled "Novel Catalysts and Methods of Use Thereof to Produce Vinyl Terminated Polymers";

b) U.S. Ser. No. 13/072,189, filed Mar. 25, 2011, entitled "Amine Functionalized Polyolefin and Methods for Preparation Thereof";

c) U.S. Ser. No. 13/072,383, filed Mar. 25, 2011, entitled "Diblock Copolymers Prepared by Cross Metathesis";

d) U.S. Ser. No. 13/072,261, filed Mar. 25, 2011, entitled "Amphiphilic Block Polymers Prepared by Alkene Metathesis";

e) U.S. Ser. No. 13/072,288, filed Mar. 25, 2011, entitled "Vinyl Terminated Higher Olefin Polymers and Methods to Produce Thereof";

f) U.S. Ser. No. 13/072,305, filed Mar. 25, 2011, entitled "Hydrosilylation of Vinyl Macromers with Metallocenes";

g) U.S. Ser. No. 13/072,432, filed Mar. 25, 2011, entitled "Olefin Triblock Polymers via Ring-Opening Metathesis Polymerization";

h) U.S. Ser. No. 13/072,330, filed Mar. 25, 2011, entitled "Block Copolymers from Silylated Vinyl Terminated Macromers";

i) U.S. Ser. No. 13/072,249, filed Mar. 25, 2011, entitled "Vinyl Terminated Higher Olefin Copolymers and Methods to Produce Thereof"; and j) U.S. Ser. No. 61/467,681, filed Mar. 25, 2011, entitled "Branched Vinyl Terminated Polymers and Methods for Production Thereof".

FIELD OF THE INVENTION

This invention relates to catalyst compounds useful for olefin polymerization particularly propylene-ethylene oligomerization to produce vinyl terminated oligomers.

BACKGROUND OF THE INVENTION

Alpha-olefins, especially those containing about 6 to about 20 carbon atoms, have been used as intermediates in the manufacture of detergents or other types of commercial products. Such alpha-olefins have also been used as monomers, especially in linear low density polyethylene. Commercially produced alpha-olefins are typically made by oligomerizing ethylene. Longer chain alpha-olefins, such as vinyl-terminated polyethylenes are also known and can be useful as building blocks following functionalization or as macromonomers.

Allyl terminated low molecular weight solids and liquids of ethylene or propylene have also been produced, typically for use as branches in polymerization reactions. See, for example, Rulhoff, Sascha and Kaminsky, ("Synthesis and Characterization of Defined Branched Poly(propylene)s with Different Microstructures by Copolymerization of Propylene and Linear Ethylene Oligomers ($C_n$=26-28) with Metallocenes/MAO Catalysts," Macromolecules 16 2006, pp. 1450-1460), and Kaneyoshi, Hiromu et al. ("Synthesis of Block and Graft Copolymers with Linear Polyethylene Segments by Combination of Degenerative Transfer Coordination Polymerization and Atom Transfer Radical Polymerization," Macromolecules 38 2005, pp. 5425-5435).

Further, U.S. Pat. No. 4,814,540 discloses bis(pentamethyl cyclopentadienyl) hafnium dichloride, bis(pentamethyl cyclopentadienyl) zirconium dichloride and bis(tetramethyl n-butyl cyclopentadienyl) hafnium dichloride with methylalumoxane in toluene or hexane with or without hydrogen to make allylic vinyl terminated propylene homo-oligomers having a low degree of polymerization of 2-10. These oligomers do not have high Mn's and have at least 93% allylic vinyl unsaturation. Likewise, these oligomers lack comonomer and are produced at low productivities with a large excess of alumoxane (molar ratio ≥600 Al/M; M=Zr, Hf). Additionally, no less than 60 wt % solvent (solvent+propylene basis) is present in all of the examples.

Teuben et al. (J. Mol. Catal., 62, 1990, pp. 277-87) used [Cp*$_2$MMe(THT)]+[BPh$_4$], M=Zr and Hf) to make propylene oligomers. For M=Zr a broad product distribution with oligomers up to $C_{24}$ (Mn 336) was obtained at room temperature. Whereas for M=Hf only the dimer 4-methyl-1-pentene and the trimer 4,6-dimethyl-1-heptene were formed. The dominant termination mechanism appeared to be beta-methyl transfer from the growing chain back to the metal center, as was demonstrated by deuterium labeling studies.

X. Yang et al. (Angew. Chem., Intl Edn., Engl., 31, 1992, pp. 1375-1377) disclose amorphous, low molecular weight polypropylene made at low temperatures where the reactions showed low activity and product having 90% allylic vinyls, relative to all unsaturations, by $^1$H NMR. Thereafter, Resconi et al. (J. Am. Chem. Soc., 114, 1992, pp. 1025-1032), disclose the use of bis(pentamethylcyclopentadienyl) zirconium and bis(pentamethylcyclopentadienyl)hafnium centers to polymerize propylene and obtained beta-methyl termination resulting in oligomers and low molecular weight polymers with "mainly allyl- and iso-butyl-terminated" chains. As is the case in U.S. Pat. No. 4,814,540, the oligomers produced do not have at least 93% allyl chain ends, an Mn of about 500 to about 20,000 g/mol (as measured by $^1$H NMR), and the catalyst has low productivity (1-12,620 g/mmol metallocene.hr; >3000 wppm Al in products).

Similarly, Small and Brookhart (Macromol., 32, 1999, pp. 2120-2130) discloses the use of a pyridylbis amido iron catalyst in a low temperature polymerization to produce low molecular weight amorphous propylene materials apparently having predominant or exclusive 2,1 chain growth, chain termination via beta-hydride elimination, and high amounts of vinyl end groups.

Weng et al. (Macromol Rapid Comm. 2000, 21, pp. 1103-1107) discloses materials with up to about 81 percent vinyl termination made using dimethylsilyl bis(2-methyl, 4-phenyl-indenyl) zirconium dichloride and methylalumoxane in toluene at about 120° C. The materials have a Mn of about 12,300 (measured with $^1$H NMR) and a melting point of about 143° C.

Macromolecules, 33, 2000, pp. 8541-8548 discloses preparation of branch-block ethylene-butene polymer made by reincorporation of vinyl terminated polyethylene, said branch-block polymer made by a combination of $Cp_2ZrCL_2$ and $(C_5Me_4SiMe_2NC_{12}H_{23})TiCl_2$ activated with methylalumoxane.

Moscardi et al. (*Organomet.*, 20, 2001, pp. 1918) disclose the use of rac-dimethylsilylmethylene bis(3-t-butyl indenyl) zirconium dichloride with methylalumoxane in batch polymerizations of propylene to produce materials where " . . . allyl end group always prevails over any other end groups, at any [propene]." In these reactions, morphology control was limited and approximately 60% of the chain ends are allylic.

Coates et al. (*Macromol.*, 2005, 38, pp. 6259-6268) disclose preparation of low molecular weight syndiotactic polypropylene ([rrrr]=0.46-0.93) with about 100% allyl end groups using bis(phenoxyimine)titanium dichloride ((PHI)$_2$ TiCl$_2$) activated with modified methyl alumoxane (Al/Ti molar ratio=200) in batch polymerizations run between −20 and +20° C. for four hours. For these polymerizations, propylene was dissolved in toluene to create a 1.65 M toluene solution. Catalyst productivity was very low (0.95 to 1.14 g/mmol Ti/hr).

JP 2005-336092 A2 discloses the manufacture of vinyl-terminated propylene polymers using materials such as $H_2SO_4$ treated montmorillonite, triethylaluminum, triisopropyl aluminum, where the liquid propylene is fed into a catalyst slurry in toluene. This process produces substantially isotactic macromonomers not having a significant amount of amorphous material.

Rose et al (Macromolecules 2008, 41, pp. 559-567) disclose poly(ethylene-co-propylene) macromonomers not having significant amounts of iso-butyl chain ends. Those were made with bis(phenoxyimine) titanium dichloride activated with modified methylalumoxane (Al/Ti molar ratio range 150 to 292) in semi-batch polymerizations (30 psi propylene added to toluene at 0° C. for 30 min, followed by ethylene gas flow at 32 psi of over-pressure at about 0° C. for polymerization times of 2.3 to 4 hours to produce E-P copolymer having an Mn of about 4800 to 23,300. In four reported copolymerizations, allylic chain ends decreased with increasing ethylene incorporation roughly according to the equation:

% allylic chain ends(of total unsaturations)=−0.95 (mol % ethylene incorporated)+100.

For example, 65% allyl (compared to total unsaturation) was reported for E-P copolymer containing 29 mol % ethylene. This is the highest allyl population achieved. For 64 mol % incorporated ethylene, only 42% of the unsaturations are allylic. Productivity of these polymerizations ranged from 0.78×10$^2$ g/mmol Ti/hr to 4.62×10$^2$ g/mmol Ti/hr.

Prior to this work, Zhu et al. reported only low (~38%) vinyl terminated ethylene-propylene copolymer made with the constrained geometry metallocene catalyst [C$_5$Me$_4$ (SiMe$_2$N-tert-butyl)TiMe$_2$ activated with B(C$_6$F$_5$)$_3$ and MMAO (*Macromol.*, 2002, 35, pp. 10062-10070 and *Macromol. Rap. Commun.*, 2003, 24, pp. 311-315).

Janiak and Blank summarize a variety of work related to oligomerization of olefins (Macromol. Symp., 236, 2006, pp. 14-22).

Rodriguez et al. in U.S. Patent No. 2005/0159299 disclose polymerization and oligomerization with catalyst compounds on a specifically treated support and exemplifies polymerization with a catalyst compound of dimethylsilyl bis(2-methyl, 4-phenyl indenyl) zirconium dimethyl on a capped support. Such catalysts however typically produce about 50% vinyl and about 50% vinylidene terminal unsaturations (of the termini that are unsaturated).

Example 18 of WO 95/27717 discloses using a dimethylsilanediyl bis(octahydrofluorenyl) zirconium dichloride compound with methylalumoxane at 50° C. to make homopropylene oligomer reported to have 95% allyl-termination, an "oligomerization degree" of 45 (which likely equates to an Mn of about 1890), and an estimated Al content of 90,000 ppm. The activities also appear low.

In all the prior art, no catalysts are shown to produce high allylic chain unsaturations in high yields, a wide range of molecular weight, and with high productivity for propylene-based polymerizations, especially propylene-ethylene copolymerizations. Thus, there is still a need for propylene based macromonomers that have allyl termination present in high amounts (90% or more), with control over a wide range of molecular weights that can be made at commercial temperatures (e.g., 25° C. and above) and commercial rates (5,000 g/mmol/hr productivity or more). Alternately, there is a need for propylene ethylene oligomers having structural robustness (where addition of ethylene raises viscosity and the solubility parameter—relative to propylene—and provides for potential crystallizable ethylene runs, while lowering glass transition temperature). Further, there is a need for propylene based reactive materials having vinyl termination which can be functionalized (and/or derivatized) and used in additive applications. Further there is a need for new, active catalysts that can operate at commercial conditions to produce such.

SUMMARY OF THE INVENTION

Hafnium (Hf) and zirconium (Zr) catalyst compounds containing benzindenyl based ligands are provided. The catalyst compounds are useful, with or without activators, to polymerize olefins, particularly α-olefins, or other unsaturated monomers, particularly propylene-ethylene oligomerization to produce vinyl terminated oligomers. Systems and processes to oligomerize and/or polymerize one or more unsaturated monomers using the catalyst compound, as well as the oligomers and/or polymers produced therefrom are also provided.

The catalyst compounds can be represented by the following structures:

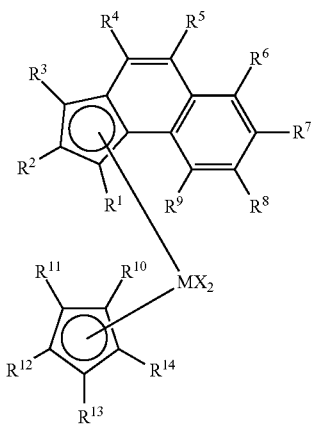

wherein:

M is hafnium or zirconium, preferably hafnium;

each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl, benzyl, chloride, bromide, iodide, (alternately two X's may form a part of a fused ring or a ring system);

each $R^1$ and $R^3$ are, independently, a $C_1$ to $C_8$ alkyl group, preferably a $C_1$ to $C_8$ linear alkyl group, preferably methyl ethyl, propyl, butyl, pentyl, hexyl, heptyl or octyl, $R^1$ may be the same or different as $R^3$ and preferably are both methyl; and each $R^2$, $R^4$, $R^5$, $R^6$, $R^7$, $R^8$, $R^9$, $R^{10}$, $R^{11}$, $R^{12}$, $R^{13}$, and $R^{14}$ are, independently, hydrogen, or a substituted hydrocarbyl or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that at least three of $R^{10}$-$R^{14}$ groups are not hydrogen (alternately four of $R^{10}$-$R^{14}$ groups are not hydrogen, alternately five of $R^{10}$-$R^{14}$ groups are not hydrogen).

Preferably all five groups of $R^{10}$-$R^{14}$ are methyl, or four of the $R^{10}$-$R^{14}$ groups are not hydrogen and at least one of the $R^{10}$-$R^{14}$ group is a $C_2$ to $C_8$ substituted hydrocarbyl or unsubstituted hydrocarbyl (preferably at least two, three, four or five of $R^{10}$-$R^{14}$ groups are a $C_2$ to $C_8$ substituted or unsubstituted hydrocarbyl).

In one embodiment, $R^1$ and $R^3$ are methyl groups, $R^2$ is a hydrogen, $R^4$-$R^9$ are all hydrogen, $R^{10}$-$R^{14}$ are all methyl groups and each X is a methyl group.

This invention further relates to a process to produce vinyl terminated macromonomers, e.g., polymers having at least 30% allyl chain ends, and preferably an Mn of from 100 g/mol or more, preferably 200 g/mol to 100,000 g/mol, preferably 200 to 60,000 g/mol using the catalysts described herein.

This invention further relates to processes to make such polymers, including homogeneous processes. This invention also relates to a homogeneous process, preferably a bulk process, to make such polymers.

DEFINITIONS

Figure 1:
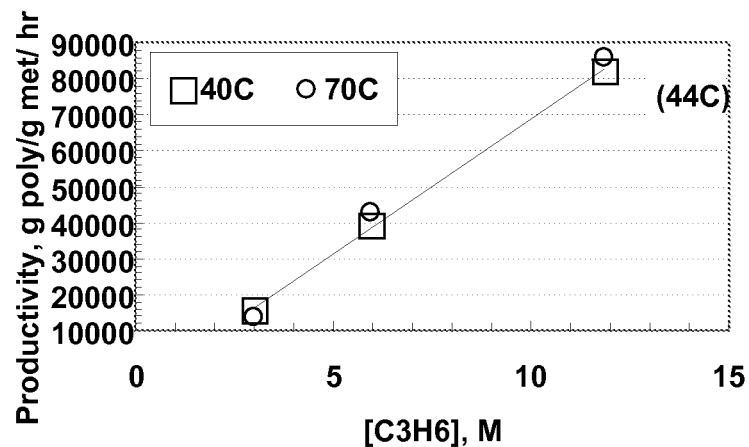
FIG. 1 is a plot of productivity versus propylene concentration.

In the structures depicted throughout this specification and the claims, a solid line indicates a bond, and an arrow indicates that the bond may be dative.

As used herein, the new notation for the Periodic Table Groups is used as described in Chemical and Engineering News, 63(5), 27 (1985).

The term "substituted" means that a hydrogen group has been replaced with a hydrocarbyl group, a heteroatom or a heteroatom containing group. For example methyl cyclopentadiene (Cp) is a Cp group substituted with a methyl group and ethyl alcohol is an ethyl group substituted with an —OH group.

The terms "hydrocarbyl radical," "hydrocarbyl" and "hydrocarbyl group" are used interchangeably throughout this document. Likewise the terms "group" and "substituent" are also used interchangeably in this document. For purposes of this disclosure, "hydrocarbyl radical" is defined to be $C_1$ to $C_{20}$ radicals, that may be linear, branched, or cyclic (aromatic or non-aromatic); and include substituted hydrocarbyl radicals as defined below.

Substituted hydrocarbyl radicals are radicals in which at least one hydrogen atom has been substituted with a heteroatom or heteroatom containing group, preferably with at least one functional group, such as halogen (Cl, Br, I, F), $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one heteroatom has been inserted within the hydrocarbyl radical, such as halogen (Cl, Br, I, F), O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where $R^*$ is, independently, hydrogen or a hydrocarbyl.

In some embodiments, the hydrocarbyl radical is independently selected from methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated and aromatic cyclic structures wherein the radical may additionally be subjected to the types of substitutions described above. Examples include phenyl, methylphenyl, benzyl, methylbenzyl, naphthyl, cyclohexyl, cyclohexenyl, methylcyclohexyl, and the like. For this disclosure, when a radical is listed, it indicates that radical type and all other radicals formed when that radical type is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An oligomer is a polymer having a low molecular weight. In some embodiments, an oligomer has an Mn of 21,000 g/mol or less (preferably 2,500 g/mol or less) in other embodiments, an oligomer has a low number of mer units (such as 75 mer units or less).

For the purposes of this disclosure, the term "α-olefin" includes ethylene. Non-limiting examples of α-olefins include ethylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

The terms "catalyst" and "catalyst compound" are defined to mean a compound capable of initiating catalysis. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is combination of at least one catalyst compound, at least one activator, an optional co-activator, and an optional support material, where the system can polymerize monomers to polymer. For the purposes of this invention and the claims thereto, when catalyst systems are described as comprising neutral stable forms of the components, it is well understood by one of ordinary skill in the art, that the ionic form of the component is the form that reacts with the monomers to produce polymers.

An "anionic ligand" is a negatively charged ligand which donates one or more pairs of electrons to a metal ion. A "neutral donor ligand" is a neutrally charged ligand which donates one or more pairs of electrons to a metal ion.

A scavenger is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the catalyst compound to form an alkylated catalyst compound, also referred to as an alkylated invention compound.

A propylene polymer is a polymer having at least 50 mol % of propylene. As used herein, Mn is number average molecular weight (measured by $^1$H NMR unless stated otherwise, Mw is weight average molecular weight (measured by Gel Permeation Chromatography), and Mz is z average molecular weight (measured by Gel Permeation Chromatography), wt % is weight percent, and mol % is mole percent. Molecular weight distribution (MWD) is defined to be Mw divided by Mn. Unless otherwise noted, all molecular weight units (e.g., Mw, Mn, Mz) are g/mol.

"Allyl chain ends" (also referred to as "allylic vinyl groups" or "allylic vinyl end groups") is defined to be a polymer having at least one terminus represented by ($CH_2CH$—$CH_2$-polymer), formula I:

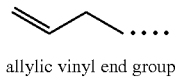

allylic vinyl end group where the "••••" represents the polymer chain. In a preferred embodiment, the allyl chain ends is represented by the formula II:

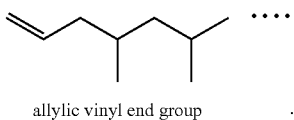

allylic vinyl end group

The amount of allyl chain ends is determined using $^1$H NMR at 120° C. using deuterated tetrachloroethane as the solvent on a 500 MHz machine and in selected cases confirmed by $^{13}$C NMR. Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl terminated propylene oligomers in J American Chemical Soc., 114, 1992, pp. 1025-1032 that are useful herein.

"Isobutyl chain end" also referred to as "isobutyl end group" is defined to be a polymer having at least one terminus represented by the formula:

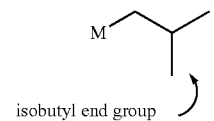

isobutyl end group where M represents the polymer chain. In a preferred embodiment, the isobutyl chain end is represented by one of the following formulae:

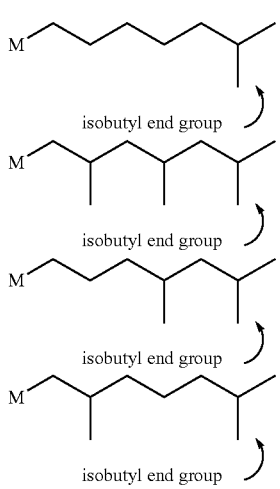

where M represents the polymer chain.

Figure 2:
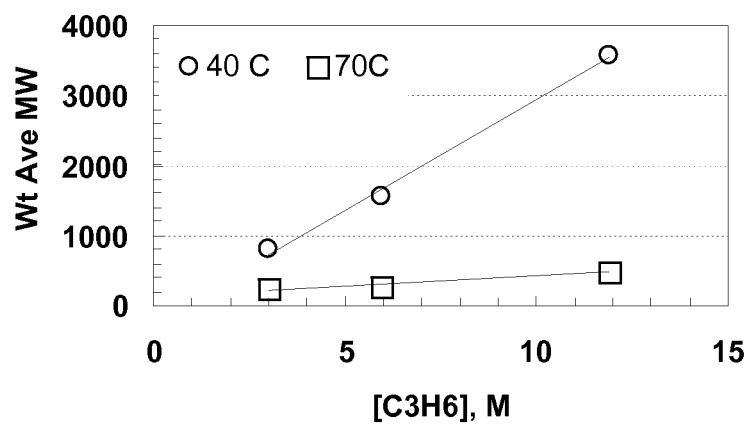
FIG. 2 is molecular weight versus propylene concentration.

The percentage of isobutyl end groups is determined using $^{13}C$ NMR (as described below) and the chemical shift assignments in Resconi et al, J. Am. Chem. Soc., 1992, 114, pp. 1025-1032 for 100% propylene polymers and as set forth in FIG. 2 of WO 2009/155471 for E-P copolymers.

The "isobutyl chain end to allylic vinyl group ratio" is defined to be the ratio of the percentage of isobutyl chain ends to the percentage of allyl chain ends.

The following abbreviations may be used through this specification: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, nBu is normal butyl, TMS is trimethylsilyl, TIBAL is triisobutylaluminum, TNOAL is triisobutyl n-octylaluminum, MAO is methylalumoxane, pMe is para-methyl, Ar* is 2,6-diisopropylaryl, Bz is benzyl, THF is tetrahydrofuran, RT is room temperature and tol is toluene.

DETAILED DESCRIPTION OF THE INVENTION

This invention relates to the use of the catalysts described herein to produce a vinyl terminated polymer (VTM), which is a polymer having at least 30% (preferably at least 40%, preferably at least 50%, preferably at least 60%, preferably at least 70%, preferably at least 80%, preferably at least 90%, preferably at least 95%) allyl chain ends, and preferably an Mn of 2000 g/mol or more, preferably 200 to 60,000 g/mol, preferably 200 to 100,000 g/mol.

This invention also relates to the use of the catalysts described herein to produce a propylene polymer, comprising propylene and less than 0.5 wt % comonomer, preferably 0 wt % comonomer, wherein the polymer has:
i) at least 93% allyl chain ends (preferably at least 95%, preferably at least 97%, preferably at least 98%);
ii) a number average molecular weight (Mn) of about 500 to about 20,000 g/mol, as measured by $^1H$ NMR (preferably 500 to 15,000, preferably 700 to 10,000, preferably 800 to 8,000 g/mol, preferably 900 to 7,000, preferably 1000 to 6,000, preferably 1000 to 5,000);
iii) an isobutyl chain end to allylic vinyl group ratio of 0.8:1 to 1.3:1.0;
iv) less than 1400 ppm aluminum, (preferably less than 1200 ppm, preferably less than 1000 ppm, preferably less than 500 ppm, preferably less than 100 ppm).

This invention also relates to a propylene copolymer produced with the catalysts described herein as having an Mn of 300 to 30,000 g/mol as measured by $^1H$ NMR (preferably 400 to 20,000, preferably 500 to 15,000, preferably 600 to 12,000, preferably 800 to 10,000, preferably 900 to 8,000, preferably 900 to 7,000 g/mol), comprising 10 to 90 mol % propylene (preferably 15 to 85 mol %, preferably 20 to 80 mol %, preferably 30 to 75 mol %, preferably 50 to 90 mol %) and 10 to 90 mol % (preferably 85 to 15 mol %, preferably 20 to 80 mol %, preferably 25 to 70 mol %, preferably 10 to 50 mol %) of one or more alpha-olefin comonomers (preferably ethylene, butene, hexene, or octene, preferably ethylene), wherein the polymer has at least X % allyl chain ends (relative to total unsaturations), where: 1) X=(−0.94 (mol % ethylene incorporated)+100{alternately 1.20 (−0.94 (mol % ethylene incorporated)+100), alternately 1.50 (−0.94 (mol % ethylene incorporated)+100)}), when 10 to 60 mol % ethylene is present in the copolymer; 2) X=45 (alternately 50, alternately 60), when greater than 60 and less than 70 mol % ethylene is present in the copolymer; and 3) X=(1.83*(mol % ethylene incorporated) −83, {alternately 1.20 [1.83*(mol % ethylene incorporated) −83], alternately 1.50 [1.83*(mol % ethylene incorporated) −83]}), when 70 to 90 mol % ethylene is present in the copolymer. Alternately X is 80% or more, preferably 85% or more, preferably 90% or more, preferably 95% or more.

In an alternate embodiment, the polymer has at least 80% isobutyl chain ends (based upon the sum of isobutyl and n-propyl saturated chain ends), preferably at least 85% isobutyl chain ends, preferably at least 90% isobutyl chain ends. Alternately, the polymer has an isobutyl chain end to allylic vinyl group ratio of 0.8:1 to 1.35:1.0, preferably 0.9:1 to 1.20:1.0, preferably 0.9:1.0 to 1.1:1.0.

This invention also relates to a propylene polymer prepared with the catalysts described herein, comprising more than 90 mol % propylene (preferably 95 to 99 mol %, preferably 98 to 9 mol %) and less than 10 mol % ethylene (preferably 1 to 4 mol %, preferably 1 to 2 mol %), wherein the polymer has:
at least 93% allyl chain ends (preferably at least 95%, preferably at least 97%, preferably at least 98%);
a number average molecular weight (Mn) of about 400 to about 30,000 g/mol, as measured by $^1H$ NMR (preferably 500 to 20,000, preferably 600 to 15,000, preferably 700 to 10,000 g/mol, preferably 800 to 9,000, preferably 900 to 8,000, preferably 1000 to 6,000);
an isobutyl chain end to allylic vinyl group ratio of 0.8:1 to 1.35:1.0; and
less than 1400 ppm aluminum, (preferably less than 1200 ppm, preferably less than 1000 ppm, preferably less than 500 ppm, preferably less than 100 ppm).

This invention also relates to a propylene polymer prepared with the catalysts described herein, comprising:
at least 50 (preferably 60 to 90, preferably 70 to 90) mol % propylene and from 10 to 50 (preferably 10 to 40, preferably 10 to 30) mol % ethylene, wherein the polymer has:
at least 90% allyl chain ends (preferably at least 91%, preferably at least 93%, preferably at least 95%, preferably at least 98%);
an Mn of about 150 to about 20,000 g/mol, as measured by $^1H$ NMR (preferably 200 to 15,000, preferably 250 to 15,000, preferably 300 to 10,000, preferably 400 to 9,500, preferably 500 to 9,000, preferably 750 to 9,000); and
an isobutyl chain end to allylic vinyl group ratio of 0.8:1 to 1.3:1.0, wherein monomers having four or more carbon atoms are present at from 0 to 3 mol % (preferably at less than 1 mol %, preferably less than 0.5 mol %, preferably at 0 mol %).

This invention also further relates to a propylene polymer prepared using the catalysts described herein, comprising:

at least 50 (preferably at least 60, preferably 70 to 99.5, preferably 80 to 99, preferably 90 to 98.5) mol % propylene, from 0.1 to 45 (preferably at least 35, preferably 0.5 to 30, preferably 1 to 20, preferably 1.5 to 10) mol % ethylene, and from 0.1 to 5 (preferably 0.5 to 3, preferably 0.5 to 1) mol % $C_4$ to $C_{12}$ olefin (such as butene, hexene or octene, preferably butene), wherein the polymer has:

at least 90% allyl chain ends (preferably at least 91%, preferably at least 93%, preferably at least 95%, preferably at least 98%);

a number average molecular weight (Mn) of about 150 to about 15,000 g/mol, as measured by $^1$H NMR (preferably 200 to 12,000, preferably 250 to 10,000, preferably 300 to 10,000, preferably 400 to 9500, preferably 500 to 9,000, preferably 750 to 9,000); and an isobutyl chain end to allylic vinyl group ratio of 0.8:1 to 1.35:1.0.

This invention also further relates to a propylene polymer produced with the catalysts described herein, comprising:

at least 50 (preferably at least 60, preferably 70 to 99.5, preferably 80 to 99, preferably 90 to 98.5) mol % propylene, from 0.1 to 45 (preferably at least 35, preferably 0.5 to 30, preferably 1 to 20, preferably 1.5 to 10) mol % ethylene, and from 0.1 to 5 (preferably 0.5 to 3, preferably 0.5 to 1) mol % diene (such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the polymer has:

at least 90% allyl chain ends (preferably at least 91%, preferably at least 93%, preferably at least 95%, preferably at least 98%);

a number average molecular weight (Mn) of about 150 to about 20,000 g/mol, as measured by $^1$H NMR (preferably 200 to 15,000, preferably 250 to 12,000, preferably 300 to 10,000, preferably 400 to 9,500, preferably 500 to 9,000, preferably 750 to 9,000); and an isobutyl chain end to allylic vinyl group ratio of 0.7:1 to 1.35:1.0.

This invention relates to the use of the catalysts described herein to produce a propylene copolymer having an Mn of 100 to 60,000 g/mol (as measured by $^1$H NMR) comprising 10 to 90 mol % propylene and 10 to 90 mol % of ethylene, wherein the copolymer has at least X % allyl chain ends (relative to total unsaturations), where: 1) X=(-0.94 (mol % ethylene incorporated)+100), when 10 to 60 mol % ethylene is present in the copolymer, and 2) X=45, when greater than 60 and less than 70 mol % ethylene is present in the copolymer, and 3) X=(1.83*(mol % ethylene incorporated) -83), when 70 to 90 mol % ethylene is present in the copolymer.

This invention further relates to the use of the catalysts described herein to produce a propylene polymer, comprising more than 90 mol % propylene and less than 10 mol % ethylene, wherein the polymer has: at least 93% allyl chain ends, an Mn of about 500 to about 20,000 g/mol (as measured by $^1$H NMR), an isobutyl chain end to allylic vinyl group ratio of 0.8:1 to 1.35:1.0, and less than 1400 ppm aluminum.

This invention further relates to the use of the catalysts described herein to produce a propylene polymer, comprising at least 50 mol % propylene and from 10 to 50 mol % ethylene, wherein the polymer has: at least 90% allyl chain ends, Mn of about 150 to 10,000 g/mol (as measured by $^1$H NMR), and an isobutyl chain end to allylic vinyl group ratio of 0.8:1 to 1.3:1.0, wherein monomers having four or more carbon atoms are present at from 0 to 3 mol %.

This invention further relates to the use of the catalysts described herein to produce a propylene polymer, comprising at least 50 mol % propylene, from 0.1 to 45 mol % ethylene, and from 0.1 to 5 mol % $C_4$ to $C_{12}$ olefin, wherein the polymer has: at least 87% allyl chain ends (alternately at least 90%), an Mn of about 150 to about 10,000 g/mol, (as measured by $^1$H NMR), and an isobutyl chain end to allylic vinyl group ratio of 0.8:1 to 1.35:1.0.

This invention further relates to the use of the catalysts described herein to produce a propylene polymer, comprising at least 50 mol % propylene, from 0.1 to 45 mol % ethylene, and from 0.1 to 5 mol % diene, wherein the polymer has: at least 90% allyl chain ends, an Mn of about 150 to about 10,000 g/mol (as measured by $^1$H NMR), and an isobutyl chain end to allylic vinyl group ratio of 0.7:1 to 1.35:1.0.

This invention further relates to the use of the catalysts described herein to produce a propylene homopolymer, wherein the polymer has: at least 93% allyl chain ends, an Mn of about 500 to about 20,000 g/mol (as measured by $^1$H NMR), an isobutyl chain end to allylic vinyl group ratio of 0.8:1 to 1.2:1.0, and less than 1400 ppm aluminum.

For purpose of this invention and the claims thereto, the term vinyl terminated polymer (also referred to as vinyl terminated polyolefin) includes vinyl terminated polymers and vinyl terminated copolymers. Preferred vinyl terminated polyolefins produced herein include vinyl terminated isotactic polypropylene (preferably having a melting point of 100° C. or more, preferably 150° C. or more), and vinyl terminated polyethylene (preferably having a melting point of 100° C. or more, preferably 115° C. or more).

In a preferred embodiment, any vinyl terminated polyolefin described herein has at least 75% allyl chain ends (relative to total unsaturations), preferably at least 80%, preferably at least 85%, preferably at least 90%, preferably at least 95%.

In a preferred embodiment, any vinyl terminated polyolefin described herein has an Mn of 200 g/mol or more, alternately from 200 to 60,000 g/mol, preferably from 200 to 50,000 g/mol, preferably from 200 to 40,000 g/mol, preferably from 500 to 30,000 g/mol, preferably from 1000 to 10,000 g/mol.

In a preferred embodiment, the vinyl terminated polyolefin produced herein comprises at least 10 mol % (alternately at least 20 mol %, alternately at least 40 mol %, alternately at least 60 mol %) of a $C_4$ or greater olefin (such as butene, pentene, octene, nonene, decene, undecene, dodecene, preferably $C_5$ to $C_{40}$ alpha olefin such as pentene, octene, nonene, decene, undecene, dodecene) and has: 1) at least 30% allyl chain ends (relative to total unsaturations), preferably at least 40%, preferably at least 50%, preferably at least 60%, preferably at least 70%, preferably at least 75%, preferably at least 80%, preferably at least 85%, preferably at least 90%, preferably at least 95%; and 2) an Mn of from 200 to 60,000 g/mol, preferably from 200 to 50,000 g/mol, preferably from 500 to 40,000 g/mol.

In a preferred embodiment, the vinyl terminated polyolefin produced herein is a homopolymer or copolymer comprising one or more C2 to C40 olefins, preferably C2 to C40 alpha olefins, preferably ethylene, propylene, butene, pentene, hexene, octene, 1-nonene, 1-decene, 1-undecene, 1-dodecene, and/or 4-methylpentene-1. In a preferred embodiment, the vinyl terminated polyolefin produced herein has an Mn of from 200 to 60,000 g/mol, preferably from 500 to 30,000 g/mol, preferably from 1,000 to 20,000 g/mol and is a homopolymer or copolymer comprising two or more $C_2$ to $C_{40}$ olefins, preferably two or more or $C_3$ to $C_{20}$ alpha olefins, preferably two or more of ethylene, propylene, butene, pentene, hexene, octene, nonene, decene, undecene, and/or dodecene and has at least 30% allyl chain ends (relative to total unsaturations), preferably at least 40%, preferably at least 50%, preferably at least 60%, preferably at least 70%, preferably at least 75%, preferably at least 80%, preferably at least 85%, preferably at least 90%, preferably at least 95%.

In a preferred embodiment, the vinyl terminated polyolefin produced herein is a polymer having an Mn of from 200 to 21,000 g/mol (preferably 500 to 15,000, preferably 800 to 20,000 g/mol) comprising one or more alpha olefins selected from the group consisting of $C_2$ to $C_{40}$ alpha olefins, preferably ethylene, propylene, butene, pentene, hexene, octene, nonene, decene, undecene, and dodecene. In a preferred embodiment, the vinyl terminated polyolefin produced herein is a polymer having an Mn of from 500 to 21,000 g/mol (preferably 700 to 21,000, preferably 800 to 20,000 g/mol) comprising two or more alpha olefins selected from the group consisting of $C_2$ to $C_{40}$ alpha olefins, preferably $C_3$ to $C_{20}$ alpha olefins, preferably two or more alpha olefins selected from the group consisting ethylene, propylene, butene, pentene, hexene, octene, nonene, decene, undecene, and dodecene and has at least 30% allyl chain ends (relative to total unsaturations), preferably at least 40%, preferably at least 50%, preferably at least 60%, preferably at least 70%, preferably at least 75%, preferably at least 80%, preferably at least 85%, preferably at least 90%, preferably at least 95%.

Preferably the vinyl terminated polyolefin produced herein is an ethylene polymer, e.g., a homo-polymer of ethylene or copolymer of ethylene and up to 50 mol % (preferably from 0.5 to 25 mol %, preferably from 1 to 20 mol %) of one or more $C_3$ to $C_{40}$ alpha olefin comonomers, preferably selected from the group consisting of propylene, butene, pentene, hexene, octene, nonene, decene, undecene, and dodecene. Alternately, the vinyl terminated polyolefin produced herein is a propylene polymer, e.g., a homopolymer of propylene or copolymer of propylene and up to 50 mol % (preferably from 0.5 to 25 mol %, preferably from 1 to 20 mol %) of one or more $C_2$ and $C_4$ to $C_{40}$ alpha olefin comonomers, preferably selected from the group consisting of ethylene, butene, pentene, hexene, octene, nonene, decene, undecene, and dodecene. Alternately, the vinyl terminated polyolefin produced herein is a copolymer of ethylene and/or propylene and a $C_4$ to $C_{40}$ alpha-olefin, such as butene, pentene, hexene, octene, nonene, decene, undecene, and dodecene and has at least 30% allyl chain ends (relative to total unsaturations), preferably at least 40%, preferably at least 50%, preferably at least 60%, preferably at least 70%, preferably at least 75%, preferably at least 80%, preferably at least 85%, preferably at least 90%, preferably at least 95%. Alternately, the vinyl terminated polyolefin produced herein is a copolymer of ethylene and/or propylene and two or more $C_4$ to $C_{40}$ alphaolefins, such as butene, pentene, hexene, octene, nonene, decene, undecene, and dodecene. In a particularly preferred embodiment, the vinyl terminated polyolefin produced herein has at least 30% allyl chain ends, relative to total unsaturations (preferably at least 40%, preferably at least 50%, preferably at least 60%, preferably at least 70%, preferably at least 75%, preferably at least 80%, preferably at least 85%, preferably at least 90%, preferably at least 95%) and the vinyl terminated polyolefin produced herein is a copolymer of:

1) ethylene and two or more $C_4$ to $C_{40}$ alpha olefins, such as butene, pentene, hexene, octene, nonene, decene, undecene, dodecene; or
2) propylene and two or more $C_4$ to $C_{40}$ alpha olefins, such as butene, pentene, hexene, octene, nonene, decene, undecene, dodecene; or
3) ethylene and propylene and two or more $C_4$ to $C_{40}$ alpha-olefins, such as butene, pentene, hexene, octene, nonene, decene, undecene, dodecene; or
4) propylene and two or more alpha olefins selected from butene, pentene, hexene, octene, nonene, decene, undecene, and dodecene.

In a preferred embodiment, the vinyl terminated polyolefin produced herein is a polymer having an Mn of greater than 1,000 g/mol (preferably from 2,000 to 60,000, preferably 5,000 to 50,000 g/mol) comprising one or more alpha olefins selected from the group consisting of $C_2$ to $C_{40}$ alpha olefins, preferably ethylene, propylene, butene, pentene, hexene, octene, nonene, decene, undecene, dodecene, and 4-methyl-pentene-1. Preferably, the vinyl terminated polyolefin produced herein is an ethylene polymer, e.g., a homopolymer of ethylene or copolymer of ethylene and up to 50 mol % (preferably from 0.5 to 25 mol %, preferably from 1 to 20 mol %) of one or more $C_3$ to $C_{40}$ alpha olefin comonomers, preferably selected from the group consisting of propylene, butene, pentene, hexene, octene, nonene, decene, undecene, dodecene, and 4-methyl-pentene-1. Alternately, the vinyl terminated polyolefin produced herein is propylene polymer, e.g., a homopolymer of propylene or a copolymer of propylene and up to 50 mol % (preferably from 0.5 to 25 mol %, preferably from 1 to 20 mol %) of one or more $C_2$ to $C_{40}$ alpha olefins comonomers, preferably selected from the group consisting of ethylene, butene, pentene, hexene, octene, nonene, decene, undecene, dodecene, and 4-methyl-pentene-1 having at least 30% allyl chain ends, relative to total unsaturations (preferably at least 40%, preferably at least 50%, preferably at least 60%, preferably at least 70%, preferably at least 75%, preferably at least 80%, preferably at least 85%, preferably at least 90%, preferably at least 95%).

In another embodiment, the vinyl terminated polyolefin produced herein may be one or more vinyl terminated polyolefins having an Mn (measured by $^1$H NMR) of 200 g/mol or more, (preferably 300 to 60,000 g/mol, 400 to 50,000 g/mol, preferably 500 to 35,000 g/mol, preferably 300 to 15,000 g/mol, preferably 400 to 12,000 g/mol, or preferably 750 to 10,000 g/mol); and comprising: (i) from about 20 to 99.9 mol % (preferably from about 25 to about 90 mol %, from about 30 to about 85 mol %, from about 35 to about 80 mol %, from about 40 to about 75 mol %, or from about 50 to about 95 mol %) of at least one $C_5$ to $C_{40}$ olefin (preferably $C_5$ to $C_{30}$ α-olefins, more preferably $C_5$-$C_{20}$ α-olefins, preferably, $C_5$-$C_{12}$ α-olefins, preferably pentene, hexene, heptene, octene, nonene, decene, undecene, dodecene, norbornene, cyclopentene, cycloheptene, cyclooctene, cyclododecene, 7-oxanorbornene, 7-oxanorbornadiene, substituted derivatives thereof, and isomers thereof, preferably hexane, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, norbornene, and their respective homologs and derivatives, preferably norbornene); and (ii) from about 0.1 mol % to about 80 mol % of propylene (preferably from about 5 mol % to about 70 mol %, from about 10 mol % to about 65 mol %, from about 15 mol % to about 55 mol %, from about 25 mol % to about 50 mol %, or from about 30 mol % to about 80 mol %); wherein the vinyl terminated polyolefins produced herein has at least 40% allyl chain ends, relative to total unsaturations (preferably at least 50%, at least 60%, at least 70%, at least 80%, at least 90%, at least 95%); and, optionally, an isobutyl chain end to allylic chain end ratio of less than 0.70:1 (preferably less than 0.65:1, less than 0.60:1, less than 0.50:1, or less than 0.25:1), and further optionally, an allyl chain end to vinylidene chain end (as determined by $^1$H NMR) ratio of more than 2:1 (preferably more than 2.5:1, more than 3:1, more than 5:1, or more than 10:1), and further optionally, an allyl chain end to vinylene chain end ratio of greater than 10:1 (preferably greater than 15:1, or greater than 20:1); and even further optionally preferably substantially no isobutyl chain ends (preferably less than 0.1 wt % isobutyl chain ends).

In another embodiment, the vinyl terminated polyolefins produced herein may be one or more vinyl terminated polyolefins having an Mn (measured by $^1$H NMR) of 200 g/mol or more (preferably 300 to 60,000 g/mol, 400 to 50,000 g/mol, preferably 500 to 35,000 g/mol, preferably 300 to 15,000 g/mol, preferably 400 to 12,000 g/mol, or preferably 750 to 10,000 g/mol) and comprises: (i) from about 80 to 99.9 mol % (preferably 85 to 99.9 mol %, more preferably 90 to 99.9 mol %) of at least one $C_4$ olefin (preferably 1-butene); and (ii) from about 0.1 to 20 mol % of propylene, preferably 0.1 to 15 mol %, more preferably 0.1 to 10 mol %; wherein the vinyl terminated polymer has at least 40% allyl chain ends, relative to total unsaturations, preferably at least 50%, at least 60%, at least 70%; or at least 80%; and, optionally, an isobutyl chain end to allylic chain end ratio of less than 0.70:1, less than 0.65:1, less than 0.60:1, less than 0.50:1, or less than 0.25:1, and further optionally, an allyl chain end to vinylidene chain end ratio of more than 2:1, more than 2.5:1, more than 3:1, more than 5:1, or more than 10:1; and, further optionally, an allyl chain end to vinylene chain end ratio of greater than 10:1 (preferably greater than 15:1, or greater than 20:1); and, even further optionally, preferably substantially no isobutyl chain ends (preferably less than 0.1 wt %).

In a preferred embodiment, the vinyl terminated polymer produced herein comprises at least 10 mol % (alternately at least 20 mol %, alternately at least 40 mol %, alternately at least 60 mol %) of a $C_4$ or greater olefin (such as butene, pentene, octene, nonene, decene, undecene, dodecene) and has: 1) at least 30% allyl chain ends (relative to total unsaturation), preferably at least 40%, preferably at least 50%, preferably at least 60%, preferably at 70%, preferably at least 75%, preferably at least 80%, preferably at least 85%, preferably at least 90%, preferably at least 95%; and 2) an Mn of from 200 to 60,000 g/mol, preferably from 200 to 50,000 g/mol, preferably from 500 to 40,000 g/mol.

In another embodiment, the vinyl terminated polyolefin produced here in may be one or more vinyl terminated polyolefin having an Mn (measured by $^1$H NMR) of 200 g/mol or more (preferably 300 to 60,000/gmol, preferably 400 to 50,000 g/mol, preferably 500 to 35,000 g/mol, preferably 300 to 15,000 g/mol, preferably 400 to 12,000 g/mol, or preferably 750 to 10,000 g/mol); and comprising: (i) from about 20 mol % to about 99.9 mol % (preferably from about 25 mol % to about 90 mol %, preferably from about 30 mol % to about 85 mol %, preferably from about 35 mol % to about 80 mol %, preferably from about 40 mol % to about 75 mol %, or from about 50 mol % to about 95 mol %) of at least one $C_5$ to $C_{40}$ α-olefins (preferably $C_5$ to $C_{30}$ α-olefins, preferably $C_5$ to $C_{20}$ α-olefins, preferably $C_5$-$C_{12}$ α-olefins, preferably pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexane, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene); and (ii) from about 0.1 mol % to 80 mol % of propylene (preferably from about 5 mol % to 70 mol %, preferably from about 10 mol % to about 65 mol %, preferably from about 15 mol % to about 55 mol %, preferably from about 25 mol % to about 50 mol %, preferably from about 30 mol % to about 80 mol %); wherein the vinyl terminated polyolefin has at least 40% allyl chain ends (preferably at least 50%, at least 60%, at least 70%, at least 80%, at least 90%, at least 95%); and, optionally, an isobutyl chain end to allylic chain end ratio of less than 0.70:1 (preferably less than 0.65:1, less than 0.60:1, less than 0.50:1, less than 0.25:1); and, further optionally, an allyl chain end to vinylidene chain end (as determined by $^1$H NMR) ratio of more than 2:1 (preferably more than 2.5:1, more than 3:1, more than 5:1, more than 10:1); and, further optionally, an allyl chain end to vinylene chain end ratio of great than 10:1 (preferably greater than 15:1, greater than 20:1); and, even further optionally, preferably substantially no isobutyl chain ends (preferably less than 0.1 wt %).

In particular embodiments herein, the invention relates to a composition comprising vinyl terminated polymers produced herein having an Mn of at least 200 g/mol, (preferably 200 to 100,000 g/mol, preferably 200 to 75,000 g/mol, preferably 200 to 60,000 g/mol, preferably 300 to 60,000 g/mol, or preferably 750 to 30,000 g/mol) (measured by $^1$H NMR) comprising of one or more (preferably two or more, three or more, four or more, and the like) $C_4$ to $C_{40}$ (preferably $C_5$ to $C_{30}$, $C_6$ to $C_{20}$, or $C_8$ to $Cl_2$, preferably butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof) higher olefin derived units, where the vinyl terminated higher olefin polymer comprises substantially no propylene derived units (preferably less than 0.1 wt % propylene); and wherein the higher olefin polymer has at least 5% (at least 10%, at least 15%, at least 20%, at least 30%, at least 40%, at least 50%, at least 60%, at least 70%; at least 80%, at least 90%, or at least 95%) allyl chain ends, relative to total unsaturations; and optionally, an allyl chain end to vinylidene chain end ratio of greater than 2:1 (preferably greater than 2.5:1, greater than 3:1, greater than 5:1, or greater than 10:1); and, further optionally, an allyl chain end to vinylene chain end ratio of greater than 10:1 (preferably greater than 15:1, or greater than 20:1); and, even further optionally, preferably substantially no isobutyl chain ends (preferably less than 0.1 wt % isobutyl chain ends). In some embodiments, these higher olefin vinyl terminated polyolefins may comprise ethylene derived units, preferably at least 5 mol % ethylene (preferably at least 15 mol % ethylene, preferably at least 25 mol % ethylene, preferably at least 35 mol % ethylene, preferably at least 45 mol % ethylene, preferably at least 60 mol % ethylene, preferably at least 75 mol % ethylene, or preferably at least 90 mol % ethylene).

Any of the polymers prepared herein preferably have less than 1400 ppm aluminum, preferably less than 1000 ppm aluminum, preferably less than 500 ppm aluminum, preferably less than 100 ppm aluminum, preferably less than 50 ppm aluminum, preferably less than 20 ppm aluminum, preferably less than 5 ppm aluminum.

Vinyl terminated polyolefins produced herein may be isotactic, highly isotactic, syndiotactic, or highly syndiotactic propylene polymer, particularly isotactic polypropylene. As used herein, "isotactic" is defined as having at least 10% isotactic pentads, preferably having at least 40% isotactic pentads of methyl groups derived from propylene according to analysis by $^{13}$C-NMR. As used herein, "highly isotactic" is defined as having at least 60% isotactic pentads according to analysis by $^{13}$C-NMR. In a desirable embodiment, VTM (preferably polypropylene) has at least 85% isotacticity. As used herein, "syndiotactic" is defined as having at least 10% syndiotactic pentads, preferably at least 40%, according to analysis by $^{13}$C-NMR. As used herein, "highly syndiotactic" is defined as having at least 60% syndiotactic pentads according to analysis by $^{13}$C-NMR. In another embodiment, the VTM (preferably polypropylene) has at least 85% syndiotacticity.

In a preferred embodiment, the propylene polymer comprises less than 3 wt % of functional groups selected from hydroxide, aryls and substituted aryls, halogens, alkoxys, carboxylates, esters, acrylates, oxygen, nitrogen, and carboxyl, preferably less than 2 wt %, more preferably less than 1 wt %, more preferably less than 0.5 wt %, more preferably less than 0.1 wt %, more preferably 0 wt %, based upon the weight of the polymer.

Any polymer produced using the catalyst described herein may have an $M_n$ of 150 to 60,000 g/mol, 200 to 50,000 g/mol, preferably 250 to 30,000 g/mol, preferably 300 to 20,000 g/mol, preferably 400 to 5,000 g/mol, preferably 750 to 2,000 g/mol. Further a desirable molecular weight range can be any combination of any upper molecular weight limit with any lower molecular weight limit described above. $M_n$ is determined according to the methods described below in the examples section.

Any polymer produced using the catalyst described herein may have a glass transition temperature (Tg) of less than 0° C. or less (as determined by differential scanning calorimetry as described below), preferably −10° C. or less, more preferably −20° C. or less, more preferably −30° C. or less, more preferably −50° C. or less.

In some embodiments, the polymer produced by the catalyst described herein preferably contains less than 80 wt % of $C_4$ olefin(s), (such as isobutylene n-butene, 2-butene, isobutylene, and butadiene), based upon the weight of the oligomer, preferably less than 10 wt %, preferably 5 wt %, preferably less than 4 wt %, preferably less than 3 wt %, preferably less than 2 wt %, preferably less than 1 wt %, preferably less than 0.5 wt %, preferably less than 0.25 wt % of $C_4$ olefin(s) based upon the weight of the polymer.

Alternately, the polymer may contain less than 20 wt % of $C_4$ or more olefin(s), (such as $C_4$ to $C_{30}$ olefins, typically such as $C_4$ to $C_{12}$ olefins, typically such as $C_4$, $C_6$, $C_8$, $C_{12}$, olefins, etc.), based upon the weight of the polymer, preferably less than 10 wt %, preferably 5 wt %, preferably less than 4 wt %, preferably less than 3 wt %, preferably less than 2 wt %, preferably less than 1 wt %, preferably less than 0.5 wt %, preferably less than 0.25 wt % of $C_4$ olefin(s) based upon the weight of the polymer, as determined by $^{13}$C NMR In another embodiment, the polymer composition produced herein comprises at least 50 wt % (preferably at least 75 wt %, preferably at least 90 wt %, based upon the weight of the polymer composition) olefins having at least 36 carbon atoms (preferably at least 51 carbon atoms, preferably at least 102 carbon atoms) as measured by $^1$H NMR assuming one unsaturation per chain.

In another embodiment, the polymer composition produced herein comprises less than 20 wt % dimer and trimer (preferably less than 10 wt %, preferably less than 5 wt %, more preferably less than 2 wt %, based upon the weight of the polymer composition), as measured by Gas Chromatography. Products are analyzed by gas chromatography (Agilent 6890N with auto-injector) using helium as a carrier gas at 38 cm/sec. A column having a length of 60 m (J & W Scientific DB-1, 60 m×0.25 mm I.D.×1.0 µm film thickness) packed with a flame ionization detector (FID), an Injector temperature of 250° C., and a Detector temperature of 250° C. are used. The sample was injected into the column in an oven at 70° C., then heated to 275° C. over 22 minutes (ramp rate 10° C./min to 100° C., 30° C./min to 275° C., hold). An internal standard, usually the monomer, is used to derive the amount of dimer or trimer product that is obtained. Yields of dimer and trimer product are calculated from the data recorded on the spectrometer. The amount of dimer or trimer product is calculated from the area under the relevant peak on the GC trace, relative to the internal standard.

In another embodiment, the polymer produced herein contains less than 25 ppm hafnium, preferably less than 10 ppm hafnium, preferably less than 5 ppm hafnium based on the yield of polymer produced and the mass of catalyst employed.

In another embodiment, the polymers described herein may have a melting point (DSC first melt) of from 60 to 130° C., alternately 50 to 100° C. In another embodiment, the polymers described herein have no detectable melting point by DSC following storage at ambient temperature (23° C.) for at least 48 hours.

Melting temperature ($T_m$) and glass transition temperature (Tg) are measured using Differential Scanning calorimetry (DSC) using commercially available equipment such as a TA Instruments 2920 DSC. Typically, 6 to 10 mg of the sample, that has been stored at room temperature for at least 48 hours, is sealed in an aluminum pan and loaded into the instrument at room temperature. The sample is equilibrated at 25° C., then it is cooled at a cooling rate of 10° C./min to −80° C. The sample is held at −80° C. for 5 min and then heated at a heating rate of 10° C./min to 25° C. The glass transition temperature is measured from the heating cycle. Alternatively, the sample is equilibrated at 25° C., then heated at a heating rate of 10° C./min to 150° C. The endothermic melting transition, if present, is analyzed for onset of transition and peak temperature. The melting temperatures reported are the peak melting temperatures from the first heat unless otherwise specified. For samples displaying multiple peaks, the melting point (or melting temperature) is defined to be the peak melting temperature (i.e., associated with the largest endothermic calorimetric response in that range of temperatures) from the DSC melting trace.

In another embodiment, the vinyl terminated polymer produced herein has a branching index, $g'_{vis}$, of 0.98 or less, alternately 0.96 or less, alternately 0.95 or less, alternately 0.93 or less, alternately 0.90 or less, alternately 0.85 or less, alternately 0.80 or less, alternately 0.75 or less, alternately 0.70 or less, alternately 0.65 or less, alternately 0.60 or less, alternately 0.55 or less.

In another embodiment, the polymers produced herein are a liquid at 25° C.

In another embodiment, the polymers produced herein have an Mw of 1,000 to about 200,000 g/mol, alternately 2000 to 150,000 g/mol, alternately 3,000 to 30,000 g/mol and/or an Mz of about 1700 to about 150,000 g/mol, alternately 800 to 100,000 g/mol.

In another embodiment, any of the vinyl terminated polyolefins described or useful herein have 3-alkyl vinyl end groups (where the alkyl is a $C_1$ to $C_{38}$ alkyl), also referred to as a "3-alkyl chain ends" or a "3-alkyl vinyl termination", represented by the formula:

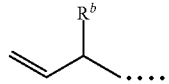

3-alkyl vinyl end group where "•••" represents the polyolefin chain and $R^b$ is a $C_1$ to $C_{38}$ alkyl group, preferably a $C_1$ to $C_{20}$ alkyl group, such as methyl, ethyl, propyl, butyl, pentyl, hexyl, heptyl, octyl, nonyl, decyl, undecyl, docecyl, and the like. The amount of 3-alkyl chain ends is determined using $^{13}C$ NMR as set out below.

In a preferred embodiment, any of the vinyl terminated polyolefins described or useful herein have at least 5% 3-alkyl chain ends (preferably at least 10%, at least 20%, at least 30%, at least 40%, at least 50%, at least 60%, at least 70%, at least 80%, at least 90%, at least 95%), relative to total unsaturation.

In a preferred embodiment, any of the vinyl terminated polyolefins described or useful herein have at least 5% of 3-alkyl+allyl chain ends, (e.g., all 3-alkyl chain ends plus all allyl chain ends), preferably at least 10% 3-alkyl+allyl chain ends, at least 20% 3-alkyl+allyl chain ends, at least 30% 3-alkyl+allyl chain ends; at least 40% 3-alkyl+allyl chain ends, at least 50% 3-alkyl+allyl chain ends, at least 60% 3-alkyl+allyl chain ends, at least 70% 3-alkyl+allyl chain ends; at least 80% 3-alkyl+allyl chain ends, at least 90% 3-alkyl+allyl chain ends; at least 95% 3-alkyl+allyl chain ends, relative to total unsaturation.

In some embodiments, the oligomers of this invention have an Mw/Mn (by GPC-DRI) of 1.5 to 20, alternately 1.7 to 10.

Mw, Mn, and Mz are measured by Gel Permeation Chromatography using a High Temperature Size Exclusion Chromatograph (either from Waters Corporation or Polymer Laboratories), equipped with a differential refractive index detector (DRI), a light scattering LS detector and a viscometer. Experimental details are described in: T. Sun, P. Brant, R. R. Chance, and W. W. Graessley, Macromolecules, Volume 34, Number 19, pp. 6812-6820, (2001) and references therein. Three Polymer Laboratories PLgel 10 mm Mixed-B LS columns are used. The nominal flow rate is 0.5 cm³/min, and the nominal injection volume is 300 μL. The various transfer lines, columns and differential refractometer (the DRI detector) are contained in an oven maintained at 45° C. Solvent for the SEC experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 μm glass pre-filter and subsequently through a 0.1 μm Teflon filter. The TCB is then degassed with an online degasser before entering the size exclusion chromatograph. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 135° C. The injection concentration is from 0.75 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. For purposes of this invention and the claims thereto (dn/dc)=0.104 for propylene polymers 0.098 for butene polymers and 0.1 otherwise. Units on parameters throughout this description of the SEC method are such that concentration is expressed in g/cm³, molecular weight is expressed in g/mol, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, Light Scattering from Polymer Solutions, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient [for purposes of this invention, $A_2$=0.0006 for propylene polymers, 0.0015 for butene polymers and 0.001 otherwise], $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and =690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the SEC-DRI-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i}$$

where the summations are over the chromatographic slices, i, between the integration limits.

The branching index $g'_{vis}$ is defined as:

$$g'_{vis} = \frac{[\eta]_{avg}}{k M_v^\alpha}$$

where, for purpose of this invention and claims thereto, α=0.695 and k=0.000579 for linear ethylene polymers, α=0.705 k=0.000262 for linear propylene polymers, and α=0.695 and k=0.000181 for linear butene polymers. $M_v$ is the viscosity-average molecular weight based on molecular weights determined by LS analysis. See Macromolecules, 2001, 34, pp. 6812-6820 and Macromolecules, 2005, 38, pp. 7181-7183, for guidance on selecting a linear standard having similar molecular weight and comonomer content, and determining k coefficients and α exponents.

$^{13}$C NMR data was collected at 120° C. in a 10 mm probe using a Varian spectrometer with a $^1$Hydrogen frequency of at least 400 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating was employed during the entire acquisition period. The spectra were acquired using time averaging to provide a signal to noise level adequate to measure the signals of interest. Samples were dissolved in tetrachloroethane-d$_2$ at concentrations between 10 wt % to 15 wt % prior to being inserted into the spectrometer magnet. Prior to data analysis spectra were referenced by setting the chemical shift of the (—CH$_2$—)$_n$ signal where n>6 to 29.9 ppm. Chain ends for quantization were identified using the signals shown in the table below. N-butyl and n-propyl were not reported due to their low abundance (less than 5%) relative to the chain ends shown in the table below.

| Chain End | $^{13}$CNMR Chemical Shift |
|---|---|
| P~i-Bu | 23-5 to 25.5 and 25.8 to 26.3 ppm |
| E~i-Bu | 39.5 to 40.2 ppm |
| P~Vinyl | 41.5 to 43 ppm |
| E~Vinyl | 33.9 to 34.4 ppm |

Polypropylene microstructure is determined by $^{13}$C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Samples are dissolved in d$_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in Polymer Conformation and Configuration (Academic Press, New York 1969) and J. Randall in Polymer Sequence Determination, $^{13}$C-NMR Method (Academic Press, New York, 1977).

$^1$H NMR $^1$H NMR data was collected at either room temperature or 120° C. (for purposes of the claims, 120° C. shall be used) in a 5 mm probe using a Varian spectrometer with a $^1$Hydrogen frequency of at least 400 MHz. Data was recorded using a maximum pulse width of 45°, 8 seconds between pulses and signal averaging 120 transients. Spectral signals were integrated and the number of unsaturation types per 1000 carbons was calculated by multiplying the different groups by 1000 and dividing the result by the total number of carbons.

The $^1$H NMR chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene | 4.70-4.84 | 2 |
| Vinylene | 5.31-5.55 | 2 |
| Trisubstituted | 5.11-5.30 | 1 |

ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, eds., Butterworth-Heinemann, Boston, Mass., 1992, pp. 633-644, is used to determine the amount of an element in a material.

Polymerization Process

This invention also relates to a process, preferably a homogeneous or bulk process, to make the vinyl terminated polymers described herein. In a preferred embodiment, monomers (such as propylene) and optional comonomers (such as ethylene) can be polymerized by reacting a catalyst system (comprising the catalysts described herein and optionally, one or more activators) with the olefins. Other additives may also be used, as desired, such as scavengers and/or hydrogen. Any conventional suspension, homogeneous, bulk, solution, slurry, or high-pressure polymerization process can be used. Such processes can be run in a batch, semi-batch, or continuous mode. Homogeneous polymerization processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 volume % or more.) Alternately no solvent or diluent is present or added in the reaction medium, (except for the small amounts used as the carrier for the catalyst system or other additives, or amounts typically found with the monomer; e.g., propane in propylene).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopars); perhalogenated hydrocarbons, such as perfluorinated C$_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, and 1-decene. Mixtures of the foregoing are also suitable. In a preferred embodiment, aliphatic hydrocarbon solvents are preferred, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration for the polymerization is 60 volume % solvent or less, preferably 40 volume % or less, preferably 20 volume % or less. Preferably the polymerization is run in a bulk process.

Suitable additives to the polymerization process can include one or more scavengers, promoters, modifiers, chain transfer agents, reducing agents, oxidizing agents, hydrogen, aluminum alkyls, or silanes.

In a preferred embodiment hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa). It has been found that in the present systems, hydrogen can be used to provide increased activity without significantly impairing the catalyst's ability to produce allylic chain ends. Preferably the catalyst activity (calculated as g/mmol catalyst/hr) is at least 20% higher than the same reaction without hydrogen present, preferably at least 50% higher, preferably at least 100% higher.

"Catalyst productivity" is a measure of how many grams of polymer (P) are produced using a polymerization catalyst comprising W g of catalyst (cat), over a period of time of T hours; and may be expressed by the following formula: P/(T× W) and expressed in units of gPgcat$^{-1}$hr$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kgP/molcat).

In an alternate embodiment, the activity of the catalyst is at least 50 g/mmol/hour, preferably 500 or more g/mmol/hour, preferably 5000 or more g/mmol/hr, preferably 50,000 or more g/mmol/hr. In an alternate embodiment, the conversion of olefin monomer is at least 10%, based upon polymer yield and the weight of the monomer entering the reaction zone, preferably 20% or more, preferably 30% or more, preferably 50% or more, preferably 80% or more. In an alternate embodiment, the productivity is at least 4500 g/mmol/hour, preferably 5000 or more g/mmol/hour, preferably 10,000 or more g/mmol/hr, preferably 50,000 or more g/mmol/hr.

In an alternate embodiment, the productivity is at least 80,000 g/mmol/hr, preferably at least 150,000 g/mmol/hr, preferably at least 200,000 g/mmol/hr, preferably at least 250,000 g/mmol/hr, preferably at least 300,000 g/mmol/hr. Preferred polymerizations can be run at typical temperatures and/or pressures, such as from 0° C. to 300° C., preferably 25° C. to 150° C., preferably 40° C. to 120° C., preferably 45° C. to 80° C., and preferably from atmospheric pressure to 10 MPa, preferably 0.35 to 10 MPa, preferably from 0.45 to 6 MPa, preferably from 0.5 to 4 MPa.

In a typical polymerization, the residence time of the reaction is up to 60 minutes, preferably between 5 to 50 minutes, preferably between 10 to 40 minutes.

In a preferred embodiment, little or no alumoxane is used in the process to produce the vinyl terminated macromers. Preferably, alumoxane is present at zero mol %, alternately the alumoxane is present at a molar ratio of aluminum to transition metal less than 500:1, preferably less than 300:1, preferably less than 100:1, preferably less than 1:1.

In an alternate embodiment, if an alumoxane is used to produce the VTM's then, the alumoxane has been treated to remove free alkyl aluminum compounds, particularly trimethyl aluminum.

Further, in a preferred embodiment, the activator used herein to produce the vinyl terminated macromer is a bulky activator as defined herein and is discrete.

In a preferred embodiment, little or no scavenger is used in the process to produce the vinyl terminated macromers. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 0° C. to 300° C. (preferably 25° C. to 150° C., preferably 40° C. to 120° C., preferably 45° C. to 80° C.); and 2) is conducted at a pressure of atmospheric pressure to 10 MPa (preferably 0.35 to 10 MPa, preferably from 0.45 to 6 MPa, preferably from 0.5 to 4 MPa); and 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are present in the solvent at less than 1 wt %, preferably at 0.5 wt %, preferably at 0 wt % based upon the weight of the solvents); and 4) wherein the catalyst system used in the polymerization comprises less than 0.5 mol %, preferably 0 mol % alumoxane, alternately the alumoxane is present at a molar ratio of aluminum to transition metal less than 500:1, preferably less than 300:1, preferably less than 100:1, preferably less than 1:1); and 5) the polymerization occurs in one reaction zone; and 6) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); and 7) optionally scavengers (such as trialkyl aluminum compounds) are absent (e.g., present at zero mol %, alternately the scavenger is present at a molar ratio of scavenger metal to transition metal of less than 100:1, preferably less than 50:1, preferably less than 15:1, preferably less than 10:1); and 8) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound. A "reaction zone" is a vessel where polymerization takes place, for example a batch reactor. A polymerization occurring in two stages in two different reactors would have two reaction zones.

Catalyst Compound

Catalyst compounds useful herein include one or more compound(s) represented by the formula:

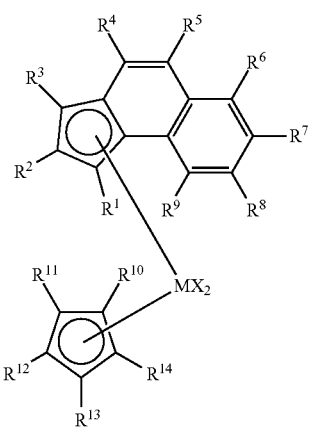

wherein

M is hafnium or zirconium, preferably hafnium;

each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl, benzyl, chloride, bromide, iodide, (alternately two X's may form a part of a fused ring or a ring system);

each $R^1$ and $R^3$ are, independently, a $C_1$ to $C_8$ alkyl group, preferably a $C_1$ to $C_8$ linear alkyl group, preferably methyl ethyl, propyl, butyl, pentyl, hexyl, heptyl or octyl, $R^1$ may be the same or different as $R^3$ and preferably are both methyl; and each $R^2$, $R^4$, $R^5$, $R^6$, $R^7$, $R^8$, $R^9$, $R^{10}$, $R^{11}$, $R^{12}$, $R^{13}$, and $R^{14}$ are, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided, however, that at least three of $R^{10}$-$R^{14}$ groups are not hydrogen (alternately four of $R^{10}$-$R^{14}$ groups are not hydrogen, alternately five of $R^{10}$-$R^{14}$ groups are not hydrogen).

In a preferred embodiment, all five groups of $R^{10}$-$R^{14}$ are methyl, or four of the $R^{10}$-$R^{14}$ groups are not hydrogen and at least one of the $R^{10}$-$R^{14}$ group is a $C_2$ to $C_8$ substituted or unsubstituted hydrocarbyl (preferably at least two, three, four or five of $R^{10}$-$R^{14}$ groups are a $C_2$ to $C_8$ substituted or unsubstituted hydrocarbyl).

In one embodiment, $R^1$ and $R^3$ are methyl groups, $R^2$ is a hydrogen, $R^4$-$R^9$ are all hydrogens, $R^{10}$-$R^{14}$ are all methyl groups and each X is a methyl group.

Catalyst compounds that are particularly useful in this invention include $(CpMe_5)(1,3-Me_2-benz[e]indenyl)HfMe_2$, $(CpMe_5)(1-methyl-3-n-propylbenz[e]indenyl)HfMe_2$, $(CpMe_5)(1-n-propyl,3-methylbenz[e]indenyl)HfMe_2$, $(CpMe_5)(1-methyl-3-n-butylbenz[e]indenyl)HfMe_2$, $(CpMe_5)(1-n-butyl,3-methylbenz[e]indenyl)HfMe_2$, $(CpMe_5)(1-ethyl,3-methylbenz[e]indenyl)HfMe_2$, $(CpMe_5)(1-methyl, 3-ethylbenz[e]indenyl)HfMe_2$, $(CpMe_4n-propyl)(1,3-Me_2-benz[e]indenyl)HfMe_2$, $(CpMe_4-n-propyl)(1-methyl-3-n-propylbenz[e]indenyl)HfMe_2$, $(CpMe_4-n-propyl)(1-n-propyl,3-methylbenz[e]indenyl)HfMe_2$, $(CpMe_4-n-propyl)(1-methyl-3-n-butylbenz[e]indenyl)HfMe_2$, $(CpMe_4-n-propyl)(1-n-butyl,3-methylbenz[e]indenyl)HfMe_2$, $(CpMe_4-n-propyl)(1-ethyl,3-methylbenz[e]indenyl)HfMe_2$, $(CpMe_4-n-propyl)(1-methyl, 3-ethylbenz[e]indenyl)HfMe_2$, $(CpMe_4n-butyl)(1,3-Me_2-benz[e]indenyl)HfMe_2$, $(CpMe_4n-butyl)(1-methyl-3-n-propylbenz[e]indenyl)HfMe_2$, $(CpMe_4n-butyl)(1-n-propyl,3-methylbenz[e]indenyl)HfMe_2$, $(CpMe_4n-butyl)(1-methyl-3-n-butylbenz[e]indenyl)HfMe_2$, $(CpMe_4n-butyl)(1-n-butyl,3-methylbenz[e]indenyl)HfMe_2$, $(CpMe_4n-butyl)(1-ethyl,3-methylbenz[e]indenyl)HfMe_2$, $(CpMe_4n-butyl)(1-methyl, 3-ethylbenz[e]indenyl)HfMe_2$, and the zirconium analogs thereof. In an alternate embodiment, the "dimethyl" ($Me_2$) after the transition metal in the list of catalyst Hf and Zr compounds above is replaced with a dihalide (such as dichloride or difluoride) or a bisphenoxide, particularly for use with an alumoxane activator.

Activators and Activation Methods for Catalyst Compounds

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio. Alternate preferred ranges include from 1:1 to 500:1, alternately 1:1 to 200:1, alternately 1:1 to 100:1, alternately from 1:1 to 50:1.

Aluminum alkyl or organoaluminum compounds which may be utilized as co-activators (or scavengers) include trimethylaluminum, triethylaluminum, triisobutylaluminum, tri-n-hexylaluminum, tri-n-octylaluminum, diethyl zinc, and the like.

Ionizing Activators

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators. More preferred activators are the ionic activators.

Examples of neutral stoichiometric activators include tri-substituted boron, tellurium, aluminum, gallium and indium or mixtures thereof. The three substituent groups are each independently selected from alkyls, alkenyls, halogens, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms, and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. Most preferably, the neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. patent application Ser. No. 08/285,380, filed Aug. 3, 1994, all of which are herein fully incorporated by reference.

Ionic catalysts can be prepared by reacting a transition metal compound with some neutral Lewis acids, such as $B(C_6F_6)_3$, which upon reaction with the hydrolyzable ligand (X) of the catalyst compound forms an anion, such as ($[B(C_6F_5)_3(X)]^-$), which stabilizes the cationic transition metal species generated by the reaction. The catalysts can be, and preferably are, prepared with activator components which are ionic compounds or compositions.

Preferred compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases such as ethers, amines and the like. Two classes of compatible non-coordinating anions have been disclosed in EP 0 277 003 A and EP 0 277 004 A1: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes and boranes.

In a preferred embodiment, the stoichiometric activators useful herein include a cation and an anion component, and may be represented by the following formula:

$$(L-H)_d^+(A^{d-}) \qquad (14)$$

wherein L is an neutral Lewis base; H is hydrogen; $(L-H)^+$ is a Bronsted acid; $A^{d-}$ is a non-coordinating anion having the charge d−; and d is an integer from 1 to 3.

The cation component, $(L-H)_d^+$ may include Bronsted acids such as protonated

Lewis bases capable of protonating a moiety, such as an alkyl or aryl, from the bulky ligand metallocene containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran and dioxane, sulfoniums from thioethers, such as diethyl thioethers and tetrahydrothiophene, and mixtures thereof.

The anion component $A^{d-}$ include those having the formula $[M^{k+}Q_n]^{d-}$ wherein k is 1, 2, or 3; n is 2, 3, 4, 5, or 6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst in the preparation of the improved catalysts of this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium) tetrakis(pentafluorophenyl)borate, trimethylammonium tetrakis-(2,3,4,6-tetrafluorophenyl) borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium) tetrakis-(2,3,4,6-tetrafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium) tetrakis-(2,3,4,6-tetrafluorophenyl)borate, trimethylammonium tetrakis (perfluoronaphthyl)borate, triethylammonium tetrakis (perfluoronaphthyl)borate, tripropylammonium tetrakis (perfluoronaphthyl)borate, tri(n-butyl)ammonium tetrakis (perfluoronaphthyl)borate, tri(t-butyl)ammonium tetrakis (perfluoronaphthyl)borate, N,N-dimethylanilinium tetrakis (perfluoronaphthyl)borate, N,N-diethylanilinium tetrakis (perfluoronaphthyl)borate, N,N-dimethyl-(2,4,6-trimethylanilinium) tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis (perfluoronaphthyl)borate, trimethylammonium tetrakis (perfluorobiphenyl)borate, triethylammonium tetrakis (perfluorobiphenyl)borate, tripropylammonium tetrakis (perfluorobiphenyl)borate, tri(n-butyl)ammonium tetrakis (perfluorobiphenyl)borate, tri(t-butyl)ammonium tetrakis (perfluorobiphenyl)borate, N,N-dimethylanilinium tetrakis (perfluorobiphenyl)borate, N,N-diethylanilinium tetrakis (perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis (perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri (n-butyl)ammonium tetrakis(3,5-bis(trifluoromethyl)phenyl)borate, tri(t-butyl)ammonium tetrakis(3,5-bis (trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene (diazonium) tetrakis(3,5-bis(trifluoromethyl)phenyl)borate, and dialkyl ammonium salts, such as di-(i-propyl)ammonium tetrakis(pentafluorophenyl)borate, and dicyclohexylammonium tetrakis(pentafluorophenyl)borate; and additional trisubstituted phosphonium salts, such as tri(o-tolyl)phosphonium tetrakis(pentafluorophenyl)borate, and tri(2,6-dimethylphenyl)phosphonium tetrakis(pentafluorophenyl) borate.

Preferably, the activator is N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetrakis(perfluorophenyl)borate.

In one embodiment, activation methods using ionizing ionic compounds not containing an active proton but capable of producing a bulky ligand metallocene catalyst cation and their non-coordinating anion are also contemplated, and are described in EP 0 426 637 A1, EP 0 573 403 A1, and U.S. Pat. No. 5,387,568, which are all herein incorporated by reference.

The term "non-coordinating anion" (NCA) means an anion which either does not coordinate to said cation or which is only weakly coordinated to said cation thereby remaining sufficiently labile to be displaced by a neutral Lewis base, such as an olefinic monomer. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the catalyst cation in the sense of balancing its ionic charge at +1, yet retain sufficient lability to permit displacement by an ethylenically or acetylenically unsaturated monomer during polymerization. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon. A stoichiometric activator can be either neutral or ionic. The terms ionic activator, and stoichiometric ionic activator can be used interchangeably. Likewise, the terms neutral stoichiometric activator, and Lewis acid activator can be used interchangeably. In addition to these activator compounds or co-catalysts, scavengers are used such as tri-isobutyl aluminum or tri-octyl aluminum.

Invention process also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl) boron or aluminum act to abstract a hydrocarbyl or hydride ligand to yield an invention cationic metal complex and stabilizing noncoordinating anion, see EP 0 427 697 A1 and EP 0 520 732 A1 for illustrations of analogous Group-4 metallocene compounds. Also, see the methods and compounds of EP 0 495 375 A1. For formation of zwitterionic complexes using analogous Group 4 compounds, see U.S. Pat. Nos. 5,624,878; 5,486,632; and 5,527,929.

Another suitable ion forming, activating cocatalyst comprises a salt of a cationic oxidizing agent and a noncoordinating, compatible anion represented by the formula:

$$(OX^{e+})_d(A^{d-})_e \qquad (16)$$

wherein $OX^{e+}$ is a cationic oxidizing agent having a charge of e+; e is 1, 2, or 3; A is a non-coordinating anion having the charge d−; and d is 1, 2, or 3. Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activators, especially tetrakis(pentafluorophenyl)borate.

The typical non-alumoxane activator-to-catalyst-precursor ratio is a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Bulky Activators

The process of this invention can also use a "bulky activator."

"Bulky activator" as used herein refers to anionic activators represented by the formula:

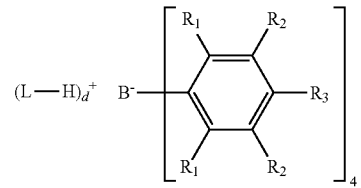

where:
each $R_1$ is, independently, a halide, preferably a fluoride;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
L is an neutral Lewis base; $(L-H)^+$ is a Bronsted acid; d is 1, 2, or 3; and
wherein the anion has a molecular weight of greater than 1020 g/mol; and wherein at least three of the substituents on the boron, B, atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Exemplary bulky substituents of activators suitable herein and their respective scaled volumes and molecular volumes are shown in the table below. The dashed bonds indicate binding to boron.

| Activator | Structure of boron substituents | Molecular Formula of each substituent | $V_S$ | MV Per subst. (Å$^3$) | Total MV (Å$^3$) |
| --- | --- | --- | --- | --- | --- |
| Dimethylanilinium tetrakis(perfluoronaphthyl)borate | [perfluoronaphthyl]$_4$ | $C_{10}F_7$ | 34 | 261 | 1044 |
| Dimethylanilinium tetrakis(perfluorobiphenyl)borate | [perfluorobiphenyl]$_4$ | $C_{12}F_9$ | 42 | 349 | 1396 |
| [4-tButyl-PhNMe$_2$H] [(C$_6$F$_3$(C$_6$F$_5$)$_2$)$_4$B] | [(C$_6$F$_3$(C$_6$F$_5$)$_2$)]$_4$ | $C_{18}F_{13}$ | 62 | 515 | 2060 |

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962 to 964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

Exemplary bulky activators useful in catalyst systems herein include: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, tropillium tetrakis(perfluoronaphthyl)borate, triphenylcarbenium tetrakis (perfluoronaphthyl)borate, triphenylphosphonium tetrakis(perfluoronaphthyl)borate, triethylsilylium tetrakis(perfluoronaphthyl)borate, benzene(diazonium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, [4-t-butyl-PhNMe$_2$H][(C$_6$F$_3$(C$_6$F$_5$)$_2$)$_4$B], and the types disclosed in U.S. Pat. No. 7,297,653.

Useful activators useful with the above catalysts include: dimethylaniliniumtetrakis(pentafluorophenyl) borate, dimethylaniliniumtetrakis(heptafluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, [4-t-butyl-PhNMe$_2$H][(C$_6$F$_3$(C$_6$F$_5$)$_2$)$_4$B].

Activator Combinations

It is within the scope of this invention that catalyst compounds can be combined with one or more activators or activation methods described above. For example, a combination of activators have been described in U.S. Pat. Nos. 5,153,157; 5,453,410; European publication EP 0 573 120 B1; PCT publications WO 94/07928 and WO 95/14044. These documents all discuss the use of an alumoxane in combination with an ionizing activator.

Monomers

Useful olefins for polymerization herewith include polymers of C$_2$ to C$_{40}$ olefins, preferably alpha-olefins, preferably ethylene and propylene.

The vinyl terminated polymers prepared herein are typically polymers of ethylene and/or propylene but can also be copolymers of ethylene and/or propylene with comonomers of C$_4$ to C$_{40}$ olefins, preferably ethylene and/or C$_5$ to C$_{25}$ olefins, or preferably C$_6$ to C$_{18}$ olefins. The C$_4$ to C$_{40}$ olefin monomers may be linear, branched, or cyclic. The C$_4$ to C$_{40}$ cyclic olefins may be strained or unstrained, monocyclic or polycyclic, and may optionally include heteroatoms and/or one or more functional groups. Exemplary C$_4$ to C$_{40}$ olefin monomers include butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexane, heptane, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene, as shown below.

Preferred vinyl terminated polymers produced herein include, homopolypropylene, propylene copolymerized with ethylene, and propylene copolymerized with ethylene and/or C$_4$ to C$_{40}$ olefins as listed above.

In a preferred embodiment, the polymer comprises 0.1 mol % to 99.9 mol % ethylene and/or 0.1 mol % to 99.9 mol % propylene.

In a preferred embodiment, the polymer comprises ethylene and propylene and from 0% to 40% termonomer.

The following paragraphs enumerated consecutively from 1 through 22 provide for various aspects of the present invention. In one embodiment, in a first paragraph (1), the present invention provides a transition metal catalyst compound represented by one of the structures:

1. A transition metal catalyst compound represented by the formula:

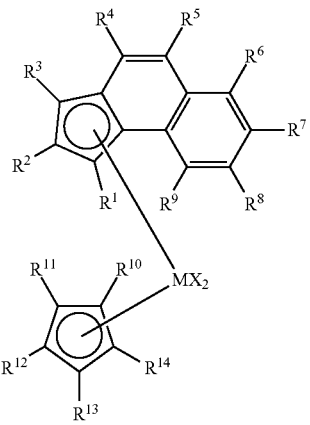

wherein

M is hafnium or zirconium, preferably hafnium;

each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl, benzyl, chloride, bromide, iodide, (alternately two X's may form a part of a fused ring or a ring system);

each R$^1$ and R$^3$ are, independently, a C$_1$ to C$_8$ alkyl group, preferably a C$_1$ to C$_8$ linear alkyl group, preferably methyl ethyl, propyl, butyl, pentyl, hexyl, heptyl or octyl, R$^1$ may be the same or different as R$^3$ and preferably are both methyl; and each R$^2$, R$^4$, R$^5$, R$^6$, R$^7$, R$^8$, R$^9$, R$^{10}$, R$^{11}$, R$^{12}$, R$^{13}$, and R$^{14}$ are, independently, hydrogen, or a substituted or unsubstituted hydrocarbyl group having from 1 to 8 carbon atoms, preferably 1 to 6 carbon atoms, preferably a substituted or unsubstituted C$_1$ to C$_8$ linear alkyl group, preferably methyl ethyl, propyl, butyl, pentyl, hexyl, heptyl, octyl, provided however that at least three of R$^{10}$-R$^{14}$ groups are not hydrogen (alternately four of $R^{10}$-$R^{14}$ groups are not hydrogen, alternately five of $R^{10}$-$R^{14}$ groups are not hydrogen).

2. The transition metal catalyst compound of paragraph 1, wherein each X is a methyl group.
3. The transition metal catalyst compound of either of paragraphs 1 or 2, wherein each $R^1$ and $R^3$ are methyl groups.
4. The transition metal catalyst compound of any of paragraphs 1 through 3, wherein $R^{10}$, $R^{11}$, $R^{12}$, $R^{13}$, and $R^{14}$ are each methyl groups.
5. The transition metal catalyst compound of any of paragraphs 1 through 4, wherein $R^2$, $R^4$, $R^5$, $R^6$, $R^7$, $R^8$, and $R^9$ are all hydrogen.
6. The transition metal catalyst compound of paragraph 1, wherein $R^1$ and $R^3$ are methyl groups, $R^2$ is a hydrogen, $R^4$, $R^5$, $R^6$, $R^7$, $R^8$, and $R^9$ are all hydrogens, $R^{10}$, $R^{11}$, $R^{12}$, $R^{13}$, and $R^{14}$ are all methyl groups and each X is a methyl group.
7. A transition metal catalyst system, comprising an activator and a catalyst compound represented by the formula:

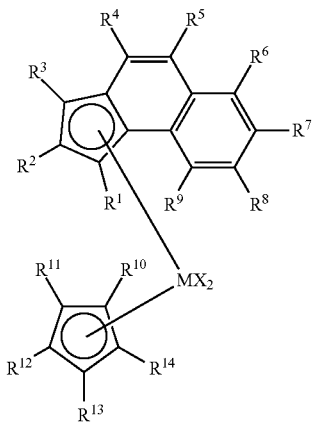

wherein
M is hafnium or zirconium, preferably hafnium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl, benzyl, chloride, bromide, iodide, (alternately two X's may form a part of a fused ring or a ring system);
each $R^1$ and $R^3$ are, independently, a $C_1$ to $C_8$ alkyl group, preferably a $C_1$ to $C_8$ linear alkyl group, preferably methyl ethyl, propyl, butyl, pentyl, hexyl, heptyl or octyl, $R^1$ may be the same or different as $R^3$ and preferably are both methyl; and
each $R^2$, $R^4$, $R^5$, $R^6$, $R^7$, $R^8$, $R^9$, $R^{10}$, $R^{11}$, $R^{12}$, $R^{13}$, and $R^{14}$ are, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that at least three of $R^{10}$-$R^{14}$ groups are not hydrogen (alternately four of $R^{10}$-$R^{14}$ groups are not hydrogen, alternately five of $R^{10}$-$R^{14}$ groups are not hydrogen).
8. The catalyst system of paragraph 7, wherein each X is a methyl group.
9. The catalyst system of either of paragraphs 7 or 8, wherein each $R^1$ and $R^3$ are methyl groups.
10. The catalyst system of any of paragraphs 7 through 9, wherein $R^{10}$, $R^{11}$, $R^{12}$, $R^{13}$, and $R^{14}$ are each methyl groups.
11. The catalyst system of any of paragraphs 7 through 10, wherein $R^2$, $R^4$, $R^5$, $R^6$, $R^7$, $R^8$, and $R^9$ are all hydrogen.
12. The catalyst system of paragraph 7, wherein $R^1$ and $R^3$ are methyl groups, $R^2$ is a hydrogen, $R^4$, $R^5$, $R^6$, $R^7$, $R^8$, and $R^9$ are all hydrogens, $R^{10}$, $R^{11}$, $R^{12}$, $R^{13}$, and $R^{14}$ are all methyl groups and each X is a methyl group.
13. The catalyst system of any of paragraphs 7 through 12, wherein the activator is selected from trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis (perfluorobiphenyl)borate, tropillium tetrakis (perfluorobiphenyl)borate, triphenylcarbenium tetrakis (perfluorobiphenyl)borate, triphenylphosphonium tetrakis (perfluorobiphenyl)borate, triethylsilylium tetrakis (perfluorobiphenyl)borate, benzene(diazonium) tetrakis (perfluorobiphenyl)borate,[4-t-butyl-PhNMe$_2$H][(C$_6$F$_3$(C$_6$F$_5$)$_2$)$_4$B] or mixtures thereof
14. A process to produce vinyl terminated polymers comprising:
    1) contacting the catalyst compound of paragraphs 1 to 6 or the catalyst system of paragraphs 7 to 13 with olefins; and
    2) obtaining polymer having at least 30% allyl chain ends and an Mn of 200 g/mol or more.
15. A process for polymerization comprising:
    1) contacting ethylene and propylene with the compound of paragraphs 1 to 6 or the catalyst of paragraphs 7 to 13;
    2) obtaining polymer having an Mn of 300 to 60,000 g/mol comprising 10 mol % to 90 mol % propylene and 10 mol % to 90 mol % of ethylene, wherein the polymer has at least X % allyl chain ends (relative to total unsaturations as measured by $^1$H NMR), where: 1) X=(−0.94(mol % ethylene incorporated)+100), when 10 mol % to 60 mol % ethylene is present in the polymer, and 2) X=45, when greater than 60 mol % and less than 70 mol % ethylene is present in the polymer, and 3) X=(1.83*(mol % ethylene incorporated)−83), when 70 mol % to 90 mol % ethylene is present in the polymer.
16. The process of paragraph 14 or 15, wherein the polymer has more than 90% allyl chain ends (relative to total unsaturations).
17. The process of paragraph 14 or 15, wherein the polymer comprises at 15 wt % to 95 wt % ethylene and has more than 80% allyl chain ends (relative to total unsaturations).
18. The process of paragraph 14 or 15, wherein the polymer comprises at 30 wt % to 95 wt % ethylene and has more than 70% allyl chain ends (relative to total unsaturations).
19. The process of paragraph 14 or 15, wherein the polymer comprises at 30 wt % to 95 wt % ethylene and has more than 90% allyl chain ends (relative to total unsaturations).
20. The process of paragraph 14 or 15, wherein the polymer comprises more than 90 mol % propylene and less than 10 mol % ethylene wherein the polymer has: at least 93% allyl chain ends, a number average molecular weight (Mn) of about 500 to about 20,000 g/mol, an isobutyl chain end to allylic vinyl group ratio of 0.8:1 to 1.35:1.0, and less than 1400 ppm aluminum.

21. The process of paragraph 14 or 15, wherein the polymer comprises at least 50 mol % propylene and from 10 mol % to 50 mol % ethylene, wherein the polymer has: at least 90% allyl chain ends, an Mn of about 150 to about 10,000 g/mol, and an isobutyl chain end to allylic vinyl group ratio of 0.8:1 to 1.2:1.0, wherein monomers having four or more carbon atoms are present at from 0 mol % to 3 mol %.

22. The process of paragraph 14 or 15, wherein the polymer comprises at least 50 mol % propylene, from 0.1 mol % to 45 mol % ethylene, and from 0.1 mol % to 5 mol % $C_4$ to $C_{12}$ olefin, wherein the polymer has: at least 90% allyl chain ends, an Mn of about 150 to about 10,000 g/mol, and an isobutyl chain end to allylic vinyl group ratio of 0.8:1 to 1.35:1.0.

23. The process of paragraph 14 or 15, wherein the polymer comprises at least 50 mol % propylene, from 0.1 mol % to 45 mol % ethylene, and from 0.1 mol % to 5 mol % diene, wherein the polymer has: at least 90% allyl chain ends, an Mn of about 150 to about 10,000 g/mol, and an isobutyl chain end to allylic vinyl group ratio of 0.7:1 to 1.35:1.0.

24. The process of paragraph 14 or 15, wherein the polymer is any polymer therein above described.

In another embodiment, this invention relates to:

1A. A process to produce vinyl terminated polymers comprising:
 1) contacting:
  a) one or more olefins with
  b) a transition metal catalyst compound represented by the formula:

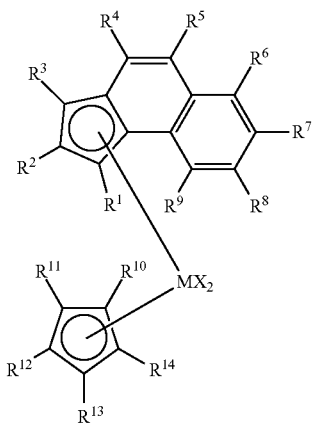

wherein
M is hafnium or zirconium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;
each $R^1$ and $R^3$ are, independently, a $C_1$ to $C_8$ alkyl group; and each $R^2$, $R^4$, $R^5$, $R^6$, $R^7$, $R^8$, $R^9$, $R^{10}$, $R^{11}$, $R^{12}$, $R^{13}$, and $R^{14}$ are, independently, hydrogen, or a substituted or unsubstituted hydrocarbyl group having from 1 to 8 carbon atoms, provided however that at least three of the $R^{10}$-$R^{14}$ groups are not hydrogen; and
2) obtaining vinyl terminated polymer having an Mn of 300 g/mol or more and at least 30% allyl chain ends (relative to total unsaturation).

2A. The process of paragraph 1A, wherein each X is a methyl group.

3A. The process of either of paragraphs 1A or 2A, wherein each $R^1$ and $R^3$ are methyl groups.

4A. The process of any of paragraphs 1A through 3A, wherein $R^{10}$-$R^{14}$ are each methyl groups.

5A. The process of any of paragraphs 1A through 4A, wherein $R^2$, $R^4$, $R^5$, $R^6$, $R^7$, $R^8$, and $R^9$ are all hydrogen.

6A. The process of paragraph 1A, wherein $R^1$ and $R^3$ are methyl groups, $R^2$ is a hydrogen, $R^4$-$R^9$ are all hydrogens, $R^{10}$-$R^{14}$ are all methyl groups and each X is a methyl group.

7A. The process of any of paragraphs 1A through 6A, wherein M is Hf.

8A. The process of any of paragraphs 1A through 7A, wherein the catalyst compound is combined with an activator.

9A. The process of paragraph 8A, wherein the activator is represented by the formula:

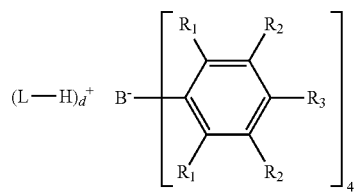

where:
each $R_1$ is, independently, a halide;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group;
each $R_3$ is a halide, $C_6$ to $C_{20}$ substituted aromatic hydrocarbyl group, or a siloxy group of the formula —O—Si—$R_a$, where $R_a$ is a $C_1$ to $C_{20}$ hydrocarbyl or hydrocarbylsilyl group;
L is an neutral Lewis base; H is hydrogen; (L-H)$^+$ is a Bronsted acid; and d is an integer from 1 to 3;
wherein the anion has a molecular weight of greater than 1020 g/mol; and
wherein at least three of the substituents on the B atom each have a molecular volume of greater than 250 cubic Å.

10A. The process of any of paragraphs 1A through 8A, wherein the activator is selected from trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, [4-t-butyl-PhNMe$_2$H][($C_6F_3$($C_6F_5$)$_2$)$_4$B] or mixtures thereof.

11A. The process of any of paragraphs 1A to 10A, wherein the olefins are ethylene and/or propylene.

12A. The process of any of paragraphs 1A to 11A, wherein termonomer is present at 0 mol % to 50 mol %.

13A. The process of any of paragraphs 1A to 11A, wherein the olefin is propylene.

14A. The process of any of paragraphs 1A to 13A, wherein the olefins comprises ethylene and propylene and the polyolefin obtained has a Mn of 200 to 60,000 g/mol and comprises 0.1 to 99.9 mol % propylene and 99.1 to 0.1 mol % of ethylene, and has at least 30% allyl chain ends.

15A. The process of paragraph 14A, wherein the polymer has X % allyl chain ends (relative to total unsaturations as measured by $^1$H NMR), where: 1) X=(−0.94(mol % ethylene incorporated)+100), when 10 mol % to 60 mol % ethylene is present in the co-polymer; and 2) X=45, when greater than 60 mol % and less than 70 mol % ethylene is present in the co-oligomer, and 3) X=(1.83*(mol % ethylene incorporated)−83), when 70 mol % to 90 mol % ethylene is present in the co-polymer.

16A. The process of paragraph 14A, wherein the polymer has more than 90% allyl chain ends (relative to total unsaturations).

17A. The process of paragraph 14A, wherein the polymer comprises at 15 wt % to 95 wt % ethylene and has more than 80% allyl chain ends (relative to total unsaturations).

18A. The process of paragraph 14A, wherein the polymer comprises at 30 wt % to 95 wt % ethylene and has more than 70% allyl chain ends (relative to total unsaturations).

19A. The process of paragraph 14A, wherein the polymer comprises at 30 wt % to 95 wt % ethylene and has more than 90% allyl chain ends (relative to total unsaturations).

20A. The process of paragraph 14A, wherein the polymer comprises more than 90 mol % propylene and less than 10 mol % ethylene wherein the polymer has: at least 93% allyl chain ends, a number average molecular weight (Mn) of about 500 to about 20,000 g/mol, an isobutyl chain end to allylic vinyl group ratio of 0.8:1 to 1.35:1.0, and less than 1400 ppm aluminum.

21A. The process of paragraph 14A, wherein the polymer comprises at least 50 mol % propylene and from 10 mol % to 50 mol % ethylene, wherein the polymer has: at least 90% allyl chain ends, an Mn of about 150 to about 10,000 g/mol, and an isobutyl chain end to allylic vinyl group ratio of 0.8:1 to 1.2:1.0, wherein monomers having four or more carbon atoms are present at from 0 mol % to 3 mol %.

22A. The process of paragraph 14A, wherein the polymer comprises at least 50 mol % propylene, from 0.1 mol % to 45 mol % ethylene, and from 0.1 mol % to 5 mol % $C_4$ to $C_{12}$ olefin, wherein the polymer has: at least 90% allyl chain ends, an Mn of about 150 to about 10,000 g/mol, and an isobutyl chain end to allylic vinyl group ratio of 0.8:1 to 1.35:1.0.

23A. The process of paragraph 14A, wherein the polymer comprises at least 50 mol % propylene, from 0.1 mol % to 45 mol % ethylene, and from 0.1 mol % to 5 mol % diene, wherein the polymer has: at least 90% allyl chain ends, an Mn of about 150 to about 10,000 g/mol, and an isobutyl chain end to allylic vinyl group ratio of 0.7:1 to 1.35:1.0.

24A. The process of any of the above paragraphs 1A to 23A, wherein the catalyst is (CpMe$_2$)(1,3Me$_2$benz[e]indenyl)HfMe$_2$ and the activator is N,N-dimethylanilinium perfluorotetraphenylborate or N,N-diMethylanilinium-tetrakis(heptafluoro-1-naphtyl)borate, where Cp is cyclopentadienyl and Me is methyl.

25A. The process of any of the above paragraphs 1 to 24, wherein the polymer has an Mn of from 300 to 60,000 g/mol.

26A. A transition metal catalyst composition represented by the formula:

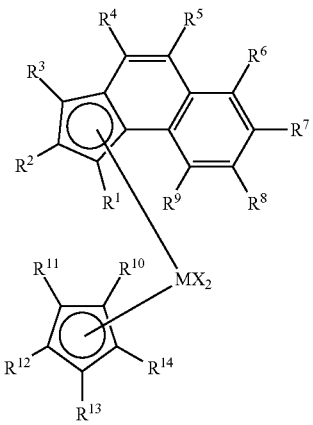

wherein

M is hafnium or zirconium;

each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;

each $R^1$ and $R^3$ are, independently, a $C_1$ to $C_8$ alkyl group; and $R^2$, $R^4$, $R^5$, $R^6$, $R^7$, $R^8$, $R^9$, $R^{10}$, $R^{11}$, $R^{12}$, $R^{13}$, and $R^{14}$ are, independently, hydrogen, or a substituted or unsubstituted hydrocarbyl group having from 1 to 8 carbon atoms, provided, however, that at least three of the $R^{10}$-$R^{14}$ groups are not hydrogen; and an activator.

27A. The transition metal catalyst composition of paragraph 26A, wherein each X is a methyl group.

28A. The transition metal catalyst composition of either of paragraphs 26A or 27A, wherein each $R^1$ and $R^3$ are methyl groups.

29A. The transition metal catalyst composition of any of paragraphs 26A through 28A, wherein $R^{10}$-$R^{14}$ are each methyl groups.

30A. The transition metal catalyst composition of any of paragraphs 26A through 29A, wherein $R^2$, $R^4$, $R^5$, $R^6$, $R^7$, $R^8$, and $R^9$ are all hydrogen.

31A. The transition metal catalyst composition of paragraph 26A, wherein $R^1$ and $R^3$ are methyl groups, $R^2$ is a hydrogen, $R^4$-$R^9$ are all hydrogens, $R^{10}$-$R^{14}$ are all methyl groups and each X is a methyl group.

32A. The transition metal catalyst composition of any of paragraphs 26A through 31A where M is Zr.

33A. A polymer of propylene produced by any of process paragraphs 1A to 25A.

34A. A polymer of propylene having an Mn of more than 30,000 g/mol and at least 30% allyl chain ends (relative to total unsaturation).

35A. The polymer of paragraph 34A, where the polymer has an isobutyl chain end to allylic vinyl group ratio of 0.8:1 to 1.3:1.0, optionally less than 1400 ppm aluminum.

EXAMPLES

Metallocene Syntheses

Typical dry-box procedures for synthesis of air-sensitive compounds were followed including using dried glassware (90° C., 4 hours) and anhydrous solvents purchased from Sigma Aldrich (St. Louis, Mo.) which were further dried over 3 A sieves. 3H-Benz[e]indene (Benzo(4,5)indene) was purchased from Boulder Scientific (Boulder, Colo.). Pentamethylcyclopentadiene was purchased from Norquay. All other reagents were purchased from Sigma-Aldrich.

Synthesis of [Li][1,3-Dimethylbenz[e]indene]

[Li][Benz[e]indene] was generated in ether by the reaction of 3H-Benz[e]indene (12.0 g, 0.072 mol) with 1.1 equivalents of n-BuLi (7.90 mL of 10 M/hexane, 0.079 mol) which was added slowly. After 2 hours, the [Li][Benz[e]indene] was isolated by removal of the ether under vacuum. The residue was triturated with hexane to give an off-white solid. The solid was collected on a medium sized glass frit by vacuum filtration, washed with excess hexane and dried in vacuo, providing pure [Li][Benz[e]indene] as an off-white solid (12.0 g, 97%). The product was characterized by $^1$H NMR: (THF-$d_8$, 250 MHz) δ ppm: 8.02 (d, J=10 Hz, $C_{10}H_6$, 1H), 7.47 (t, J=6.3 Hz, $C_{10}H_6$, 2H), 7.09 (t, J=6.2 Hz, $C_{10}H_6$, 1H), 6.91 (t, J=1 Hz, $C_{10}H_6$, 1H), 6.74 (d, J=10 Hz, $C_{10}H_6$, 1H), 6.59 (s, indenyl proton, 1H), 6.46 (s, indenyl proton, 1H), 6.46 (s, indenyl proton, 1H), 6.09 (s, indenyl proton, 1H).

[Li][Benz[e]indene] (12.0 g, 0.070 mol) was dissolved in ether, cooled to −35° C. and reacted with 6.0 equivalents of MeI (59.34 g, 0.418 mmol). The reaction was allowed to warm to ambient temperature. After 12 hours, the reaction was quenched with water and extracted with ether. The organics were concentrated to yield a crude oil which was distilled using Kugelrohr apparatus to provide a clear oil which was a clean mixture of 3-methyl-3H-benz[e]indene and 1-methyl-1H-benz[e]indene isomers (7.58 g, 58%). The product was characterized by $^1$H NMR: ($CD_2Cl_2$, 250 MHz) δ ppm: 8.25-7.42 (m, $C_{10}H_6$, 10H), 7.15 (d, J=6.3 Hz, $C_{10}H_6$, 2H), 7.09 (t, J=6.2 Hz, $C_{10}H_6$, 1H), 6.91 (t, J=1 Hz, $C_{10}H_6$, 1H), 6.74 (d, J=10 Hz, $C_{10}H_6$, 1H), 6.59 (s, indenyl proton, 1H), 6.46 (s, indenyl proton, 1H), 6.46 (s, indenyl proton, 1H), 6.09 (s, indenyl proton, 1H).

Similarly, [Li][methylbenz[e]indene] was generated in ether by the reaction of the isomer mix of 3-methyl-3H-benz[e]indene and 1-methyl-1H-benz[e]indene (7.58 g, 0.041 mol) with 1.1 equivalents of n-BuLi (4.45 mL of 10 M/hexane, 0.045 mol) which was added slowly. After 2 hours, the [Li][methylbenz[e]indene] was isolated by removal of the ether under vacuum. The residue was triturated with hexane to give an off-white solid. The solid was collected on a medium sized glass frit by vacuum filtration, washed with excess hexane and dried in vacuo, providing pure [Li][methylbenz[e]indene] as an off-white solid (6.97 g, 85%).

[Li][methylbenz[e]indene] (6.97 g, 0.037 mol) was dissolved in ether, cooled to −35° C. and reacted with 3.7 equivalents of MeI (19.52 g, 0.138 mmol). The reaction was allowed to warm to ambient temperature. After 12 hours, the reaction was quenched with water and extracted with ether. The organics were concentrated to yield a yellow oil which was a mixture of 1,3-dimethyl-3H-benz[e] indene, 1,3-dimethyl-1H-benz[e] indene, 3,3-dimethyl-3H-benz[e]indene, and 1,1-dimethyl-1H-benz[e]indene isomers (6.63 g, 91%).

Similarly, [Li][1,3-Dimethylbenz[e]indene] was generated in ether by the reaction of the dimethylbenzindene isomer mixture above (6.63 g, 0.034 mol) with 1.1 equivalents of n-BuLi (3.74 mL of 10 M/hexane, 0.037 mol) which was added slowly. After 2 hours, the [Li][1,3-Dimethylbenz[e] indene] was isolated by removal of the ether under vacuum. The residue was triturated with hexane to give an off-white solid. The solid was collected on a medium sized glass frit by vacuum filtration, washed with excess hexane and dried in vacuo, providing pure [Li][1,3-Dimethylbenz[e]indene] as an off-white solid (5.43 g, 79%). The product was characterized by $^1$H NMR: (THF-$d_8$, 250 MHz) δ ppm: 8.19 (d, J=7.5 Hz, 1H), 7.48 (d, J=7.5 Hz, 1H), 7.33 (d, J=7.5 Hz, 2H), 7.09 (t, J=1.4 Hz, 1H), 6.91 (t, J=1.2 Hz, 1H), 6.67 (d, J=8.5 Hz, 1H), 5.98 (s, 1H), 2.65 (s, 3H), 2.34 (s, 3H).

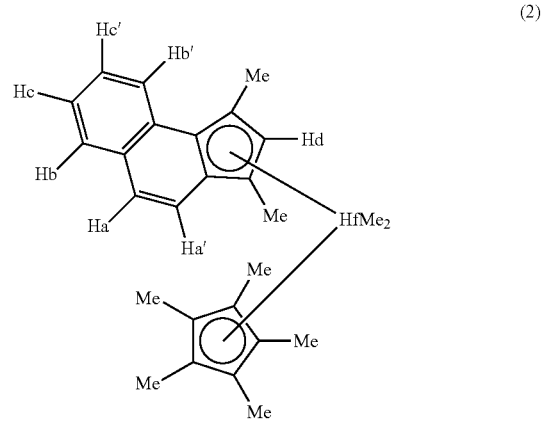

(2)

Synthesis of (CpMe$_5$)(1,3-Me$_2$-benz[e]indenyl)HfMe$_2$ (2)

CpMe$_5$HfCl$_3$ (3.8 g) was reacted with [Li][1,3-Me$_2$-benz[e]indenyl] (2.5 g, 4.3 mmol) in Et$_2$O (80 ml) for 48 hrs. (Crowther, D.: Baenziger, N.; Jordan, R.; J. Journal of the American Chemical Society (1991), 113(4), pp. 1455-1457.) The pale yellow product was collected by filtration over a glass frit and dried to yield crude (CpMe$_5$)(1,3-Me$_2$-benz[e]indenyl)HfCl$_2$ (3.2 g) as a mixture with LiCl. $^1$H NMR (CD$_2$Cl$_2$, 250 MHz) δ ppm; 8.13, 7.80 (d, Ha, Ha', 1H), 7.59 to 7.36 (multiplets, Hb, Hb', Hc, Hc', 4H) 6.10 (s, Hd, 1H), 2.62, 2.45 (s, 1,3Me$_2$C$_9$H$_5$, 3 H), 2.10 (s, CpMe$_5$).

(CpMe$_5$)(1,3-Me$_2$-benz[e]indenyl)HfCl$_2$ (2.5 g) was slurried in toluene (100 ml) and reacted with MeMgI (4.2 g, 2.1 equiv, 3.0 M in Et$_2$O). The reaction mixture was heated to 80° C. for 3 hrs. After cooling the volatiles were removed in vacuo to yield a solid which was extracted with hexane (4×40 ml). Hexane was removed from the combined extractions to yield solid yellow (CpMe$_5$)(1,3-Me$_2$C$_9$H$_5$)HfMe$_2$ (1.6 g). $^1$H NMR(C$_6$D$_6$, 300 MHz) δ ppm; 7.55-7.48 (m, C$_6$H$_4$, 2H), 7.20-7.16 (m, C$_9$H$_5$, 3H), 2.00 (s, 1,3Me$_2$C$_9$H$_5$, 6H), 1.76 (s, CpMe$_5$, 15H), −0.95 (s, Hf-Me, 6H).

Polymerizations

Batch polymerizations were carried out using a 2 L stirred autoclave reactor. Polymerization conditions used with 2 (CpMe$_5$)(1,3Me$_2$-benz[e]indenyl)HfMe$_2$ are described in Table 1. Catalyst solutions were prepared in a dry nitrogen purged Vacuum Atmospheres™ dry box by adding nearly equimolar (typically 1.00:1.05) quantities of metallocene and activator to 2 mL dry toluene in a 10 mL glass vial. The mixture was stirred for several minutes and then transferred to a clean, oven dried catalyst tube. An example of the basic polymerization procedure follows: 2 mL at 25 wt % tri-n-octyl aluminum (TNOA)-in-hexanes scavenger and 500 mL propylene were added to reactor, the reactor was heated to 70°

C., then catalyst 2/activator A (N,N-dimethylaniliniumperfluorotetraphenylborate) were flushed from the catalyst tube into the reactor with 500 mL hexanes. Polymerization was carried out for 30 minutes, then the reactor was cooled, depressurized, and opened. The residual propylene and hexanes concentration in the product was reduced either through "weathering" or by heating the sample in the oven under nitrogen purge. Some of the lowest molecular weight oligomer product was presumed lost along with the propylene. In some cases, residual propylene was still detected in the product in $^1$H NMRs recorded at 30° C. (not detected when spectra recorded at 120° C.).

TABLE 1

Summary of Polymerizations with catalyst 2/Activator A with propylene

| Run | Hexanes, Vol % | Cat/Activator (mg/mg) | Tp. (C) | Time (min) | Yield (g) |
|---|---|---|---|---|---|
| 1 | 0 | 5/11.3 | 44 | 70 | 480 |
| 2 | 50 | 5/11.3 | 40 | 70 | 228 |
| 3 | 75 | 5/11.3 | 40 | 70 | 92 |
| 4 | 0 | 5/11.3 | 70 | 30 | 215 |
| 5 | 50 | 5/11.3 | 70 | 30 | 102 |
| 6 | 75 | 5/11.3 | 70 | 60 | 68 |

The impact of propylene concentration on catalyst productivity recorded at two different temperatures is shown in FIG. 1.

Product Characterization

Products prepared with 2 were characterized by $^1$H NMR and GPC-DRI (PP std). $^1$H NMR spectra were recorded for solutions of polymer dissolved in CDCl$_3$ (30° C.) or tetrachloroethane-d$_2$ (120° C.) (TMS lock). $^1$H NMR data are summarized in Table 2. Products made with 2 and Activator A retain high allylic vinyl populations—96% to 97%).

GPC-DRI data are reported in Table 3.

TABLE 2

$^1$H NMR Results for Allylic Vinyl Polypropylene

| | Unsats/1000 C. | | | | | |
|---|---|---|---|---|---|---|
| Run | Vinylenes + olefins | vinyls | vinylidenes | % Vinyl | DP | MN $^1$H NMR |
| 1 | 0.20 | 9.62 | 0.07 | 97.27 | 33.70 | 1415.6 |
| 2 | 0.33 | 15.46 | 0.2 | 96.5 | 20.8 | 874 |
| 3 | 2.31 | 23.48 | 0 | 90.8 | 12.9 | 541 |
| 4 | 0.8 | 39.45 | 0.5 | 96.9 | 8.19 | 343.8 |
| 5 | 0.8 | 42.5 | 0.6 | 96.8 | 7.6 | 319.1 |
| 6 | 1.1 | 45.5 | 0.8 | 96.0 | 7.0 | 295.2 |

DP = Degree of Polymerization

TABLE 3

GPC-DRI Results (iPP Standard)

| Run | MN $^1$H NMR | Mn | Mw | Mz | Mn/Mw* |
|---|---|---|---|---|---|
| 1 | 1415.6 | 884 | 3,574 | 8,430 | 4.04 |
| 2 | 874 | 511 | 1561 | 8872 | 3.05 |
| 3 | 541 | 363 | 794 | 1768 | 2.18 |
| 4 | 343.8 | 131 | 493 | 3827 | 3.76 |
| 5 | 319.1 | 185 | 279 | 460 | 1.51 |
| 6 | 295.2 | 167 | 244 | 386 | 1.46 |

*Both determined by GPC

Continuous polymerization of propylene-ethylene polymer was conducted in a 1 liter internal volume Continuous Flow Stirred Tank Reactor using isohexane as the solvent. The liquid full reactor had a variable residence time of approximately 15 to 45 minutes and the pressure was maintained at 320 psig (2206 kPa). A mixed feed of isohexane, ethylene and propylene was pre-chilled to approximately −30° C. to remove the heat of polymerization, before entering the reactor. The pre-chilling temperature was adjusted to maintain indicated solution polymerization temperature. The solution of catalyst/activator in toluene and the scavenger in isohexane were separately and continuously admitted into the reactor to initiate the polymerization. The reactor temperature was varied from between 50° C. and 60° C.

Isohexane, ethylene, and propylene were fed to the reactor at the rates shown in Table 4. The catalyst 2 was activated in vitro with 1:102 molar ratio with N,N'-Dimethyl aniliniumtetrakis (heptafluoro-1-naphthyl)borate indicated below in Table 4 and introduced into the polymerization reactor at the rates indicated in Table 4. A dilute solution of tri n-octyl aluminum was introduced into the reactor as a scavenger. A rate of approximately 5.16 X 10-3 mmol/min of scavenger was fed continuously into the unit for this polymerization. After five residence times of steady polymerization, a representative sample of the polymer produced in this polymerization was collected. The solution of the polymer was withdrawn from the top, and then steam distilled to isolate the polymer. The polymerization product was collected for a certain time and conversions calculated as shown in Table 7. The polymer produced in this polymerization was analyzed for ethylene content by FT-IR (reported in Table 6) and by GPC (reported in Table 6). Unsaturated chain ends were determined by $^1$H NMR (6+120° C.) and are reported in Table 7.

TABLE 4

| Run | Temp, ° C. | C3 Feed Rate, g/min | C2 Feed Rate, g/min | Isohexane Feed Rate, g/min | Catalyst Feed Rate, mol/min | Activator Feed Rate, mol/min | Scavenger Feed Rate, mol/min |
|---|---|---|---|---|---|---|---|
| A | 60 | 5 | 1 | 59.5 | $1.24 \times 10^{-7}$ | $1.27 \times 10^{-7}$ | $5.16 \times 10^{-6}$ |
| B | 60 | 10 | 2 | 59.5 | $2.48 \times 10^{-7}$ | $2.53 \times 10^{-7}$ | $5.16 \times 10^{-6}$ |
| C | 50 | 15 | 3 | 59.5 | $2.48 \times 10^{-7}$ | $2.53 \times 10^{-7}$ | $5.16 \times 10^{-6}$ |
| D | 50 | 15 | 5 | 59.5 | $1.86 \times 10^{-7}$ | $1.90 \times 10^{-7}$ | $5.16 \times 10^{-6}$ |

TABLE 5

| | H NMR - (Unsat/1000 C.) | | | | % | % vi- |
|---|---|---|---|---|---|---|
| Run | vinylenes | olefins | vinyls | vinylidenes | vinyls | nylidenes |
| A | 0.04 | 0.38 | 15.5 | 0.27 | 96 | 1.7 |
| B | 0.02 | 0.39 | 16.1 | 0.28 | 96 | 1.7 |
| C | 0.02 | 0.26 | 11 | 0.16 | 96 | 1.4 |
| D | 0.01 | 0.12 | 6.14 | 0.1 | 96 | 1.6 |

TABLE 6

| | Mn by | GPC-DRI | | | | wt % C2, |
|---|---|---|---|---|---|---|
| Run | $^1$H NMR | Mn | Mw | Mz | Mw/Mn | FTIR |
| A | 2150 | 481 | 1182 | 2392 | 2.457 | 51 |
| B | 1877 | 446 | 1184 | 2439 | 2.655 | 45 |
| C | 1638 | 710 | 1960 | 3970 | 2.761 | 39 |
| D | 2268 | 1416 | 5127 | 46771 | 3.621 | 54 |

TABLE 7

| Run | Temp, C. | yield, g | Conversion, % | collection time, min | met mol × 10 − 7/min | yield Kg/mol | yield, Kg/g |
|---|---|---|---|---|---|---|---|
| A | 60 | 267.8 | 23.5 | 190 | 1.24 | 11367 | 21 |
| B | 60 | 484.3 | 20.2 | 200 | 2.48 | 9764 | 18 |
| C | 50 | 1240.7 | 38.3 | 180 | 2.48 | 27793 | 52 |
| D | 50 | 1052.1 | 39 | 135 | 1.86 | 41900 | 78 |

Example A

Comparison of Activators I to III

Polymerizations were conducted in an inert atmosphere (N$_2$) drybox using 48 Cell Parallel Pressure Reactors (PPR) equipped with external heaters for temperature control, glass inserts (internal volume of reactor=22.5 mL), septum inlets, regulated supply of nitrogen, propylene, and equipped with disposable PEEK (PolyEtherEtherKetone) mechanical stirrers (800 RPM). The PPRs were prepared for polymerization by purging with dry nitrogen at 150° C. for 5 hours and then at 25° C. for 5 hours. The reactors were heated to 25° C. and propylene was then charged to the reactor. A solution of scavenger/co-catalyst at process temperature and pressure was next added to the reactors via syringe. The reactors were heated to process temperature (85° C.) and stirred at 800 RPM. Catalyst was mixed with the activator and stirred in toluene at ambient temperature and pressure and added to the reactors (at process temperature and pressure) via syringe as a solution to initiate polymerization. Because the solutions are added via syringe, a hexanes solution is also injected via the same syringe following their addition to insure that minimal solution is remaining in the syringe. This procedure is applied after the addition of the scavenger/co-catalyst solution as well as the catalyst solution. Propylene was allowed to enter the reactors to a desired pressure through the use of regulators and allowed to drop during the polymerization. No pressure control was employed during the run. Reactor temperatures were monitored and typically maintained within a +/−1° C. temperature range. Polymerizations were quenched by the addition of approximately 50 psi (345 kPa) delta of Industrial Grade Air for approximately 60 seconds. The polymerizations were quenched after the desired polymerization time. The reactors were cooled and vented. The polymer was isolated after the remaining reaction components were removed in-vacuo. Yields reported include total weight of polymer and residual catalyst. Yields are listed in Table A, below. Run time was varied, as indicated in Table A; Activator to metallocene ratio was 1:1; Reaction temperature was 85° C.; catalyst concentration was 5×10$^{-5}$ mol/L; TNOAL concentration was 1.2×10$^{-4}$ mol/L. Total solution volume was 5 mLs.

TABLE A

Comparison of Activators I to III

| Run | Metallocene (MCN) | Activator | [C3], mol/L | Run Time, s | Yield, mg |
|---|---|---|---|---|---|
| A1 | E | I | 1.4 | 300.7 | 62.7 |
| A2 | E | I | 1.4 | 216.1 | 87.5 |
| A3 | E | III | 1.4 | 298.3 | 80 |
| A4 | E | III | 1.4 | 301.3 | 82.1 |
| A5 | E | II | 1.4 | 303 | 79.6 |
| A6 | E | II | 1.4 | 286.8 | 78 |
| B1 | G | I | 1.4 | 211.7 | 103.5 |
| B2 | G | I | 1.4 | 219.5 | 107.3 |
| B3 | G | III | 1.4 | 217.8 | 99.1 |
| B4 | G | III | 1.4 | 213.9 | 107.4 |
| B5 | G | II | 1.4 | 243.6 | 104.9 |
| B6 | G | II | 1.4 | 300.7 | 92.9 |
| C1 | A | I | 1.4 | 71.3 | 163.4 |
| C2 | A | I | 1.4 | 71.6 | 170 |
| C3 | A | III | 1.4 | 94.5 | 157.3 |
| C4 | A | III | 1.4 | 80.8 | 145.5 |
| C5 | A | II | 1.4 | 99.1 | 148.5 |
| C6 | A | II | 1.4 | 103.7 | 154.9 |
| D1 | G | I | 1.4 | 61.1 | 190.9 |
| D2 | G | I | 1.4 | 60.2 | 197.9 |
| D3 | G | III | 1.4 | 76.2 | 166.1 |
| D4 | G | III | 1.4 | 74.8 | 178.9 |
| D5 | G | II | 1.4 | 117.7 | 155 |
| D6 | G | II | 1.4 | 115.9 | 156 |
| E1 | E | I | 2.9 | 198 | 125.4 |
| E2 | E | I | 2.9 | 141.5 | 144.7 |
| E3 | E | III | 2.9 | 144.7 | 137.3 |
| E4 | E | III | 2.9 | 171 | 133.4 |
| E5 | E | II | 2.9 | 189.1 | 135.5 |
| E6 | E | II | 2.9 | 175.2 | 121.5 |
| F1 | G | I | 2.9 | 138.7 | 147.6 |
| F2 | G | I | 2.9 | 173.2 | 141.9 |
| F3 | G | III | 2.9 | 161.3 | 150.4 |
| F4 | G | III | 2.9 | 125.2 | 165.4 |
| F5 | G | II | 2.9 | 127.9 | 163 |
| F6 | G | II | 2.9 | 157.4 | 139.4 |
| G1 | A | I | 2.9 | 55.4 | 265.5 |
| G2 | A | I | 2.9 | 56.1 | 271.5 |
| G3 | A | III | 2.9 | 75.7 | 245.2 |
| G4 | A | III | 2.9 | 90.5 | 234 |
| G5 | A | II | 2.9 | 80.5 | 233.4 |
| G6 | A | II | 2.9 | 81.8 | 240.7 |
| H1 | G | I | 2.9 | 37 | 296.7 |
| H2 | G | I | 2.9 | 45.4 | 326.9 |
| H3 | G | III | 2.9 | 54.2 | 319.3 |
| H4 | G | III | 2.9 | 49 | 294.6 |
| H5 | G | II | 2.9 | 72.2 | 281.3 |
| H6 | G | II | 2.9 | 78.6 | 276.5 |

Data from the analysis of some of the cell products is shown in the Table 5B, below.

TABLE 5B

Data for Comparison of Activators I to III

| Run | MCN | ACT | Yield g | % Vinyls | % VYD | Mn (HNMR) | Mn (GPC) | Mw/Mn (GPC) |
|---|---|---|---|---|---|---|---|---|
| A1 | E | I | 0.063 | 88 | 12 | 655 | — | — |
| A2 | E | I | — | — | — | — | 1137 | 2.2 |
| A3 | E | III | 0.08 | 98.6 | 1.4 | 642 | 1072 | 2.9 |
| A5 | E | II | 0.08 | 99.2 | 0.8 | 786 | 857 | 1.6 |
| B1 | G | I | 0.104 | 52.2 | 47.8 | 683 | 745 | 1.4 |
| B3 | G | III | 0.099 | 92.4 | 7.6 | 1018 | 4416 | 2.3 |
| B5 | G | II | 0.105 | 95.7 | 4.3 | 1073 | 1079 | 1.7 |
| C1 | A | I | 0.163 | 70.8 | 29.2 | 4806 | 2775 | 3.1 |
| C3 | A | III | 0.157 | 91.2 | 6.3 | 7441 | 5754 | 2.2 |
| C5 | A | II | 0.149 | 85.5 | 12.8 | 7119 | 6326 | 2.1 |
| D1 | G | I | 0.191 | 31.8 | 62.5 | 16,712 | 13,597 | 2.6 |
| D3 | G | III | 0.166 | 66.1 | 33.8 | 32,186 | 36,789 | 2.4 |
| D5 | G | II | 0.155 | 57.4 | 41.3 | 38,166 | 34,217 | 2.3 |
| G1 | A | I | 0.266 | 71.5 | 27.2 | 4424 | — | — |
| G3 | A | III | 0.245 | 91.3 | 5.9 | 7762 | — | — |
| G5 | A | II | 0.233 | 81.6 | 13.5 | 9277 | — | — |

KEY:
MCN = metallocene,
ACT = activator,
VYD = vinylidene

Metallocenes Used in Example A

The following metallocenes were used in Example A.

| Metallocene | Structure |
|---|---|
| A | (structure) |
| B | (structure) |
| C | (structure) |
| D | (structure) |
| E | (structure) |
| F | (structure) |
| G | (structure) |

Activators Used

The following activators were used in Example A.

| Activator | Chemical Name |
| --- | --- |
| I | Dimethylaniliniumtetrakis(pentafluorophenyl)borate |
| II | Dimethylaniliniumtetrakis(perfluorobiphenyl)borate |
| III | Dimethylaniliniumtetrakis(perfluoronaphthyl)borate |

All documents described herein are incorporated by reference herein for purposes of all jurisdictions where such practice is allowed, including any priority documents, related applications, and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A propylene-ethylene copolymer having an Mn of more than 30,000 g/mol and up to 60,000 g/mol, and at least 90% allyl chain ends relative to total unsaturation; and wherein the polymer is produced with a single metallocene catalyst at a temperature within the range of 25 to 150° C. and a pressure within the range of 0.45 to 6 MPa.

2. The copolymer of claim 1, where the polymer has an isobutyl chain end to allylic vinyl group ratio of 0.8:1 to 1.3:1.0, and has less than 1400 ppm aluminum.

3. The copolymer of claim 1, wherein the polymer has at least 95% allyl chain ends relative to total unsaturation.

4. The copolymer of claim 1, wherein the polymer has an Mn of more than 30,000 g/mol up to 40,000 g/mol.

5. The copolymer of claim 1, wherein the polymer has an Mn of more than 30,000 g/mol up to 60,000 g/mol and comprises 90 to 40 mol% propylene and 10 to 60 mol% of ethylene, wherein the copolymer has at least X% allyl chain ends relative to total unsaturation, where: X=(−0.94(mol% ethylene incorporated)+100).

6. The copolymer of claim 1, wherein the polymer has an Mn of more than 30,000 g/mol up to 60,000 g/mol and comprises 10 to 30 mol% propylene and 70 to 90 mol% of ethylene.

7. The copolymer of claim 1, wherein the polymer has a melting point of 100° C. or more.

8. The copolymer of claim 1, wherein the polymer has a Tg of 0° C. or less.

9. The copolymer of claim 1, wherein the polymer has a melting point of 150° C. or more.

10. The copolymer of claim 1, wherein the polymer has less than 1400 ppm of aluminum.

11. The copolymer of claim 1, wherein the polymer has less than 25 ppm of hafnium.

12. The copolymer of claim 1, wherein the polymer has a melting point of from 60 to 130° C.

13. The copolymer of claim 1, wherein the polymer has a Tg of −10° C. or less.

14. The copolymer of claim 1, wherein the polymer has a Tg of −20° C. or less.

15. The copolymer of claim 1, wherein the polymer has a Tg of −30° C. or less.

16. The copolymer of claim 1, wherein the polymer has a Tg of −50° C. or less.

17. A propylene-ethylene copolymer having an Mn of from 300 to 30,000 g/mol and at least 90% allyl chain ends relative to total unsaturation; and wherein the polymer is produced with a single metallocene catalyst at a temperature within the range of 25 to 150° C. and a pressure within the range of 0.45 to 6 MPa.

18. The copolymer of claim 17, where the polymer has an isobutyl chain end to allylic vinyl group ratio of 0.8:1 to 1.3:1.0, and has less than 1400 ppm aluminum.

19. The copolymer of claim 17, wherein the polymer has an Mn of more than 30,000 g/mol up to 100,000 g/mol.

20. The copolymer of claim 17, wherein the polymer has an Mn of more than 30,000 g/mol up to 40,000 g/mol.

21. The copolymer of claim 17, wherein the polymer has an Mn of more than 30,000 g/mol up to 60,000 g/mol and comprises 90 to 40 mol% propylene and 10 to 60 mol% of ethylene, wherein the copolymer has at least X% allyl chain ends relative to total unsaturation, where: X=(−0.94(mol% ethylene incorporated)+100).

22. The copolymer of claim 17, wherein the polymer has a melting point of 100° C. or more.

23. The copolymer of claim 17, wherein the polymer has a Tg of 0° C. or less.

24. The copolymer of claim 17, wherein the polymer has a melting point of from 60 to 130° C.

25. The copolymer of claim 17, wherein the polymer has a Tg of −10° C. or less.

* * * * *